(12) United States Patent
Perez et al.

(10) Patent No.: US 10,275,370 B2
(45) Date of Patent: Apr. 30, 2019

(54) OPERATING SYSTEM DONGLE

(71) Applicant: GOOGLE INC., Mountain View, CA (US)

(72) Inventors: Alberto Martin Perez, Mountain View, CA (US); Katie Leah Roberts-Hoffman, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 134 days.

(21) Appl. No.: 14/949,149

(22) Filed: Nov. 23, 2015

(65) Prior Publication Data

US 2016/0196220 A1 Jul. 7, 2016

Related U.S. Application Data

(60) Provisional application No. 62/099,771, filed on Jan. 5, 2015.

(51) Int. Cl.
*G06F 13/10* (2006.01)
*G06F 9/445* (2018.01)
(Continued)

(52) U.S. Cl.
CPC ........ *G06F 13/102* (2013.01); *G06F 9/44505* (2013.01); *G06F 21/31* (2013.01); *G06F 21/44* (2013.01)

(58) Field of Classification Search
CPC .......................... G06F 13/102; G06F 9/44505
(Continued)

(56) References Cited

U.S. PATENT DOCUMENTS 8,102,400 B1 * 1/2012 Cook .................... G06F 3/1462
345/539
8,341,087 B2 * 12/2012 Lee ......................... H04L 67/42
705/64

(Continued)

FOREIGN PATENT DOCUMENTS

JP 2008521097 A 6/2008
JP 2010165289 A 7/2010
(Continued)

OTHER PUBLICATIONS

"Chromebox for Meetings", available online at <https://www.google.com/work/chrome/devices/for-meetings/#specs>, retrieved on Dec. 29, 2014, 3 pages.
(Continued)

*Primary Examiner* — Idriss N Alrobaye
*Assistant Examiner* — Henry W Yu
(74) *Attorney, Agent, or Firm* — Brake Hughes Bellermann LLP

(57) ABSTRACT

In one general aspect, a method can include determining that a display monitor is operatively connected to a display port included in an operating system (OS) dongle, identifying at least one peripheral device operatively connected to the OS dongle, receiving, by the OS dongle, an indication of requested content from the at least one peripheral device, and responsive to receiving the indication of the requested content, obtaining the requested content from a computer system remote from the OS dongle. The obtaining can include operatively connecting the OS dongle to a network. The network can be operatively interfaced to the computer system that includes the requested remote content. The method can include providing, by the OS dongle, the requested content to the display monitor using the display port.

20 Claims, 13 Drawing Sheets

(51) Int. Cl.
*G06F 21/31* (2013.01)
*G06F 21/44* (2013.01)

(58) Field of Classification Search
USPC .......................... 710/73; 713/2, 100; 726/9
See application file for complete search history.

(56) References Cited

U.S. PATENT DOCUMENTS

| | | | | |
|---|---|---|---|---|
| 8,477,082 | B2* | 7/2013 | Lee | G06F 9/445 |
| | | | | 345/2.1 |
| 9,053,250 | B2* | 6/2015 | Halim | G06F 13/409 |
| 9,400,801 | B1* | 7/2016 | Aplemakh | G06F 17/30194 |
| 2006/0287110 | A1* | 12/2006 | Klitsner | A63F 13/10 |
| | | | | 463/44 |
| 2007/0277115 | A1* | 11/2007 | Glinsky | G01V 1/34 |
| | | | | 715/771 |
| 2008/0172555 | A1* | 7/2008 | Keenan | G06F 9/4406 |
| | | | | 713/2 |
| 2010/0138832 | A1* | 6/2010 | Kim | G06F 9/45537 |
| | | | | 718/1 |
| 2010/0153862 | A1* | 6/2010 | Schreiber | G06F 9/454 |
| | | | | 715/760 |
| 2011/0258333 | A1 | 10/2011 | Pomerantz | |
| 2013/0225290 | A1 | 8/2013 | Zhou | |
| 2013/0311990 | A1* | 11/2013 | Tang | G06F 9/45558 |
| | | | | 718/1 |
| 2014/0032327 | A1* | 1/2014 | Prakash | G06Q 30/02 |
| | | | | 705/14.64 |
| 2014/0337611 | A1* | 11/2014 | Kuscher | G06F 9/4401 |
| | | | | 713/100 |
| 2016/0072797 | A1* | 3/2016 | Wilson | H04L 63/0892 |
| | | | | 726/9 |
| 2016/0086390 | A1* | 3/2016 | Berkobin | G07C 5/008 |
| | | | | 701/1 |

FOREIGN PATENT DOCUMENTS

| | | |
|---|---|---|
| JP | 2011048661 A | 3/2011 |
| JP | 2013247614 A | 12/2013 |
| JP | 2014229278 A | 12/2014 |
| WO | 2016/111831 A1 | 7/2016 |

OTHER PUBLICATIONS

"Chromecast", available online at <http://www.google.com/chrome/devices/chromecast/>, retrieved on Dec. 29, 2014, 7 pages.

"Dell Wyse Cloud Connect—Users Guide", available online at <http://www.dell.com/learn/us/en/04/shared-content~data-sheets~en/documents~wyse_cloud_connect_users_guide.pdf>, dated Feb. 2014, retrieved on Dec. 29, 2014, 28 pages.

"DV Dongle—Frequently Asked Questions", available online at <http://www.dvdongle.com/DV_Dongle/FAQ.html>, retrieved on Dec. 29, 2014, 4 pages.

"I6 Miracast", available online at <http://ugoos.net/ugoos-oem?product_id=124>, retrieved on Dec. 29, 2014, 2 pages.

"Introducing CloudGate Android PC", available online at <http://www.cloudgate.co.za/>, retrieved on Dec. 29, 2014, 6 pages.

"List of Rockchip RK3288 Android TV Boxes So Far", available online at <http://www.cnx-software.com/2014/06/25/list-of-rockchip-rk3288-android-tv-boxes/>, retrieved on Dec. 29, 2014, 20 pages.

"M2 EZcast", available online at <http://ugoos.net/ugoos-m2-miracast?search=M2%20EZcast>, retrieved on Dec. 29, 2014, 2 pages.

"MK809IV", available online at <http://ugoos.net/ugoos-mk809iv-rk3188?search=MK809IV>, retrieved on Dec. 29, 2014, 2 pages.

"OEM Products", available online at <http://ugoos.net/ugoosoem?limit=50>, retrieved on Dec. 29, 2014, 10 pages.

"UG017 Miracast", available online at <http://ugoos.net/ug017?search=017%20MIRACAST>, retrieved on Dec. 29, 2014, 2 pages.

"UGOOS UM2", available online at <http://ugoos.net/ugoos-um2>, retrieved on Dec. 29, 2014, 2 pages.

apple.com, "Mac Mini", available online at <http://www.apple.com/mac-mini/>, retrieved on Dec. 29, 2014, 5 pages.

dell.com, "Wyse Cloud Connect", Executive Summary, available online at <https://www.dell.com/learn/us/en/04/shared-content~data-sheets~en/documents~dell-cloud-connect-executive-summary-final.pdf>, dated Nov. 13, 2014, 3 pages.

dell.com, "Wyse Cloud Connect—Reviewer's Guide", available online at <https://www.arp.nl/webmedias/datasheet/14508203.pdf>, dated 2014, retrieved on Dec. 29, 2014, 18 pages.

Murph, Darren, "Always Innovating HDMI Dangle Brings Android to Your 'dumb TV' (video)", available online at <http://www.engadget.com/2012/01/07/always-innovating-hdmi-dongle-android-tv-video/>, dated Jan. 7, 2012, retrieved on Dec. 29, 2014, 12 pages.

Piltch, Avram, "6 Best Uses for an Android Mini PC", available online at <http://www.laptopmag.com/articles/android-mini-pc>, dated May 16, 2013, retrieved on Dec. 29, 2014, 6 pages.

Protalinski, Emil, "Matchstick and Mozilla take on Chromecast with Firefox OS dongle, launch Kickstarter to drive down $25 price", available online at <http://thenextweb.com/dd/2014/09/30/matchstick-mozilla-take-chromecast-firefox-os-dongle-launch-kickstarter-drive-25-price/>, dated Sep. 30, 2014, retrieved on Dec. 29, 2014, 6 pages.

International Search Report and Written Opinion for PCT Application No. PCT/US2015/066787, dated Mar. 31, 2016, 13 pages.

Office Action for Japanese Application No. 2017-535805, dated Oct. 2, 2018, 11 pages.

Communication pursuant to Article 94(3) for European Application No. 15823101.9, dated Nov. 30, 2018, 8 pages.

Office Action for Japanese Application No. 2017-535805 (with English Translation), dated Jan. 22, 2019, 10 pages.

* cited by examiner

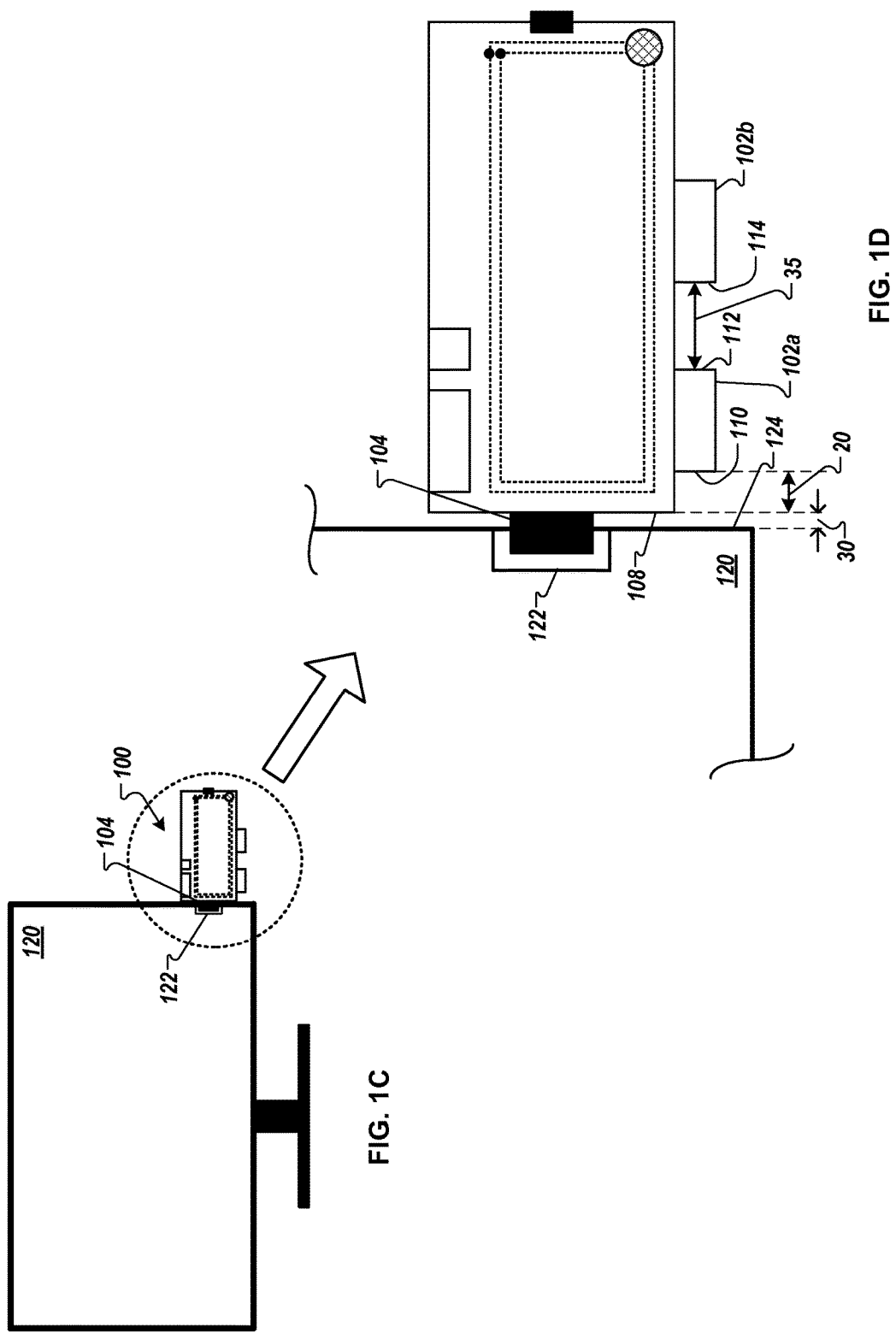

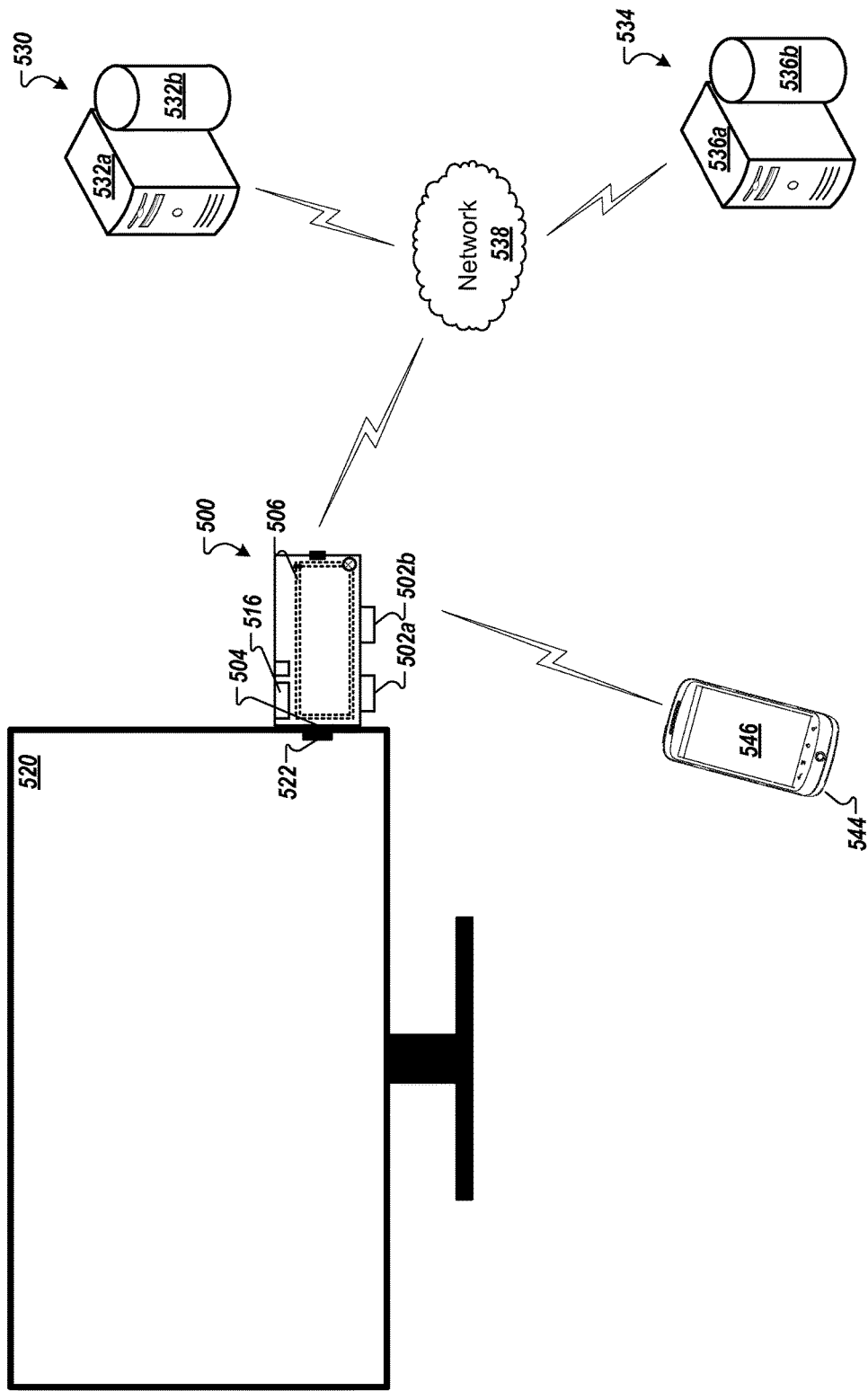

OPERATING SYSTEM DONGLE

CROSS-REFERENCE TO RELATED APPLICATIONS

This application claims priority under 35 U.S.C. § 119(e)(1), to U.S. Provisional Application Ser. No. 62/099,771, filed on Jan. 5, 2015, the entire contents of which are incorporated herein.

TECHNICAL FIELD

This description generally relates a dongle that can be connected to various different types of devices.

BACKGROUND

The inclusion of many storage devices, input devices, output devices, sensors and other types of hardware in a computing device can affect the overall cost and performance of the computing device. In many cases, a user of the computing device may not use, need, or take advantage of all of the available hardware and computing power of the computing device. In addition, much of what a user may use or run on a computing device (e.g., software applications, files, video content) can be included in and stored on the cloud on one or more servers remote from the computing device. In these cases, a user may only need a way to take lower-cost, available hardware (e.g., a display device or monitor, a mobile phone, a tablet) and interface it to the cloud to run applications and access files and content stored in the cloud.

SUMMARY

In one general aspect, a method includes determining that a display monitor is operatively connected to a display port included in an operating system (OS) dongle, identifying at least one peripheral device operatively connected to the OS dongle, receiving, by the OS dongle, an indication of requested content from the at least one peripheral device, responsive to receiving the indication of the requested content, obtaining the requested content from a computer system remote from the OS dongle, the obtaining including operatively connecting the OS dongle to a network, the network being operatively interfaced to the computer system that includes the requested remote content, and providing, by the OS dongle, the requested content to the display monitor using the display port.

Example implementations may include one or more of the following features. For instance, the method can further include receiving, by the OS dongle, user authentication credentials, and based on verifying the user authentication credentials, enabling the OS dongle to receive input from the at least one peripheral device. The user authentication credentials can be associated with an owner of the OS dongle. The user authentication credentials can be associated with a user of the OS dongle authorized by a cloud administrator of the OS dongle. The at least one peripheral device can be one of a keyboard, trackpad, touchpad, and mouse.

In another general aspect, a method includes booting an operating system; included in an operating system (OS) dongle, determining that a display monitor is connected to a display port included in an operating system (the OS) dongle, requesting authentication of a user of the OS dongle, receiving user authentication credentials, entering the OS dongle into a kiosk mode of operation based on the received user authentication credentials, establishing a connection to a network, the network including a connection to at least one computer system, executing, by the OS dongle, a cloud based application on the OS dongle, the cloud based application included in the at least one computer system, and providing, by the OS dongle, output from the cloud based application to the display monitor using the display port.

Example implementations may include one or more of the following features. For instance, the user authentication credentials can be for an owner of the OS dongle. The method can further include accessing at least one setting for the owner of the OS dongle based on the received user authentication credentials, the at least one setting being a list of users authorized to use the OS dongle. The method can further include updating the list of authorized users. The method can further include updating, for at least one authorized user included in the updated list of authorized users, an indication of what the at least one authorized user is authorized to do with the OS dongle. The user authentication credentials can be for a user authorized as a user of the OS dongle by an owner of the OS dongle. The method can further include accessing at least one setting for the user of the OS dongle based on the received user authentication credentials. The method can further include changing, by the user, the accessed at least one setting. Receiving user authentication credentials can include receiving a near field communication (NFC) enabled one time password (OTC) token.

In yet another general aspect, an apparatus can include a display port configured to interface to a display connector included on a display monitor, a WiFi communication module, a central processing unit (CPU), a graphics processing unit (GPU), a video processing unit (VPU), and a WiFi antenna configured to operatively interface with the WiFi communication module and a WiFi network external to the apparatus, the CPU, the GPU, and the VPU operatively configured to execute an operating system on the apparatus, and to execute at least one application stored remote from the apparatus.

Example implementations may include one or more of the following features. For instance, the remote application can be stored on the cloud. The apparatus can further include a Bluetooth communication module configured to operatively couple at least one peripheral device to the apparatus. The at least one peripheral device can be one of a keyboard, trackpad, touchpad, and mouse. The apparatus can further include at least one communications connector, and a Universal Serial Bus (USB) communication module configured to operatively couple at least one peripheral device interfaced to the at least one communications connector to the apparatus. The apparatus can further include a memory configured to operatively support the operating system while allowing a user to locally buffer content and data securely. The apparatus can further include a memory interface configured to provide an interface between the memory and the CPU, the GPU, and the VPU. A height of the apparatus is approximately 0.5 inches, a length of the apparatus is approximately 3.2 inches, and a width of the apparatus is approximately 2.2 inches. The apparatus can further include a communications module configured to receive user authentication credentials. The CPU, the GPU, and the VPU can be operatively configured to execute the operating system on the apparatus and to execute the at least one application stored remote from the apparatus based on the received user authentication credentials.

The details of one or more implementations are set forth in the accompanying drawings and the description below.

Other features will be apparent from the description and drawings, and from the claims.

BRIEF DESCRIPTION OF THE DRAWINGS

FIG. 1C is a diagram that illustrates an example OS dongle plugged into/connected to a display monitor.

FIG. 1D is a diagram that illustrates a detailed view of an example OS dongle plugged into/connected to a display monitor.

FIG. 5A is a diagram that illustrates the use of an operating system dongle with a display monitor and a mobile device.

Like reference symbols in the various drawings indicate like elements.

DETAILED DESCRIPTION

In general, most computing devices can include numerous hardware components for performing a vast array of tasks for a user. In many cases, however, a user may use and interact with a small subset of the hardware components. The inclusion of numerous hardware components such as storage devices, input devices, output devices, sensors and other types of hardware in a computing device can add significantly to the cost of the computing device. Many users, however, interact with software applications (e.g., email, browsers) that are resident on the cloud or accessible using the World Wide Web. Users can access content (e.g., streaming video or audio files (e.g., movie, music)) that is resident on the cloud or accessible using the World Wide Web. Users can also manage and store image and data files (e.g., pictures and documents) in storage on the cloud or some type of server remote from the computing device.

Users may also want to access software applications, content, image files, and data files on multiple types of devices. In some cases, the devices may belong to (e.g., be owned by) the user. In some cases, the devices may be publically accessible devices or devices that belong to (e.g., are owned by) someone else. For example, a user may be traveling to a conference where the user is scheduled to be a presenter. While traveling, the user may want to access his or her presentation on multiple devices owned or provided by the user (e.g., a laptop computer, a notebook computer, a mobile phone, a tablet). The user may also want to access the presentation on multiple devices that he or she does not own or provide. These systems can include, but are not limited to, presentation systems located in the facility hosting the conference, a hotel room that has a television or display monitor, and a public computer or kiosk located in the lobby of a hotel or in a coffee shop. The user may want to access, edit, and/or run the presentation. The ability to perform these operations on the presentation necessitate access to the data file that includes the presentation as well as the software application(s) needed to access, edit, and run the presentation.

Figure 1A:
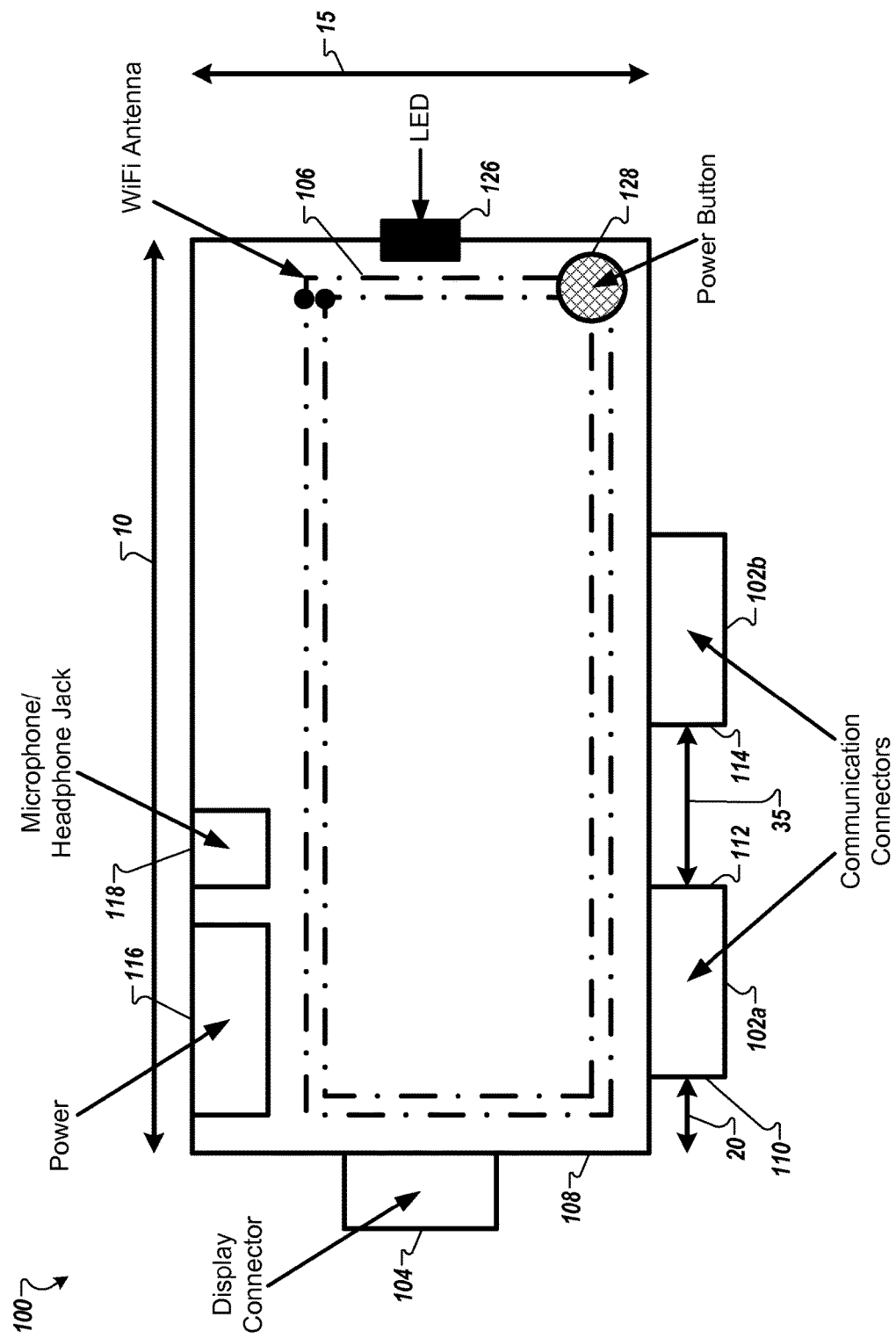
FIG. 1A is a diagram that illustrates an example operating system dongle from a top view.

FIG. 1A is a diagram that illustrates an example operating system (OS) dongle 100 from a top view.

Figure 1B:
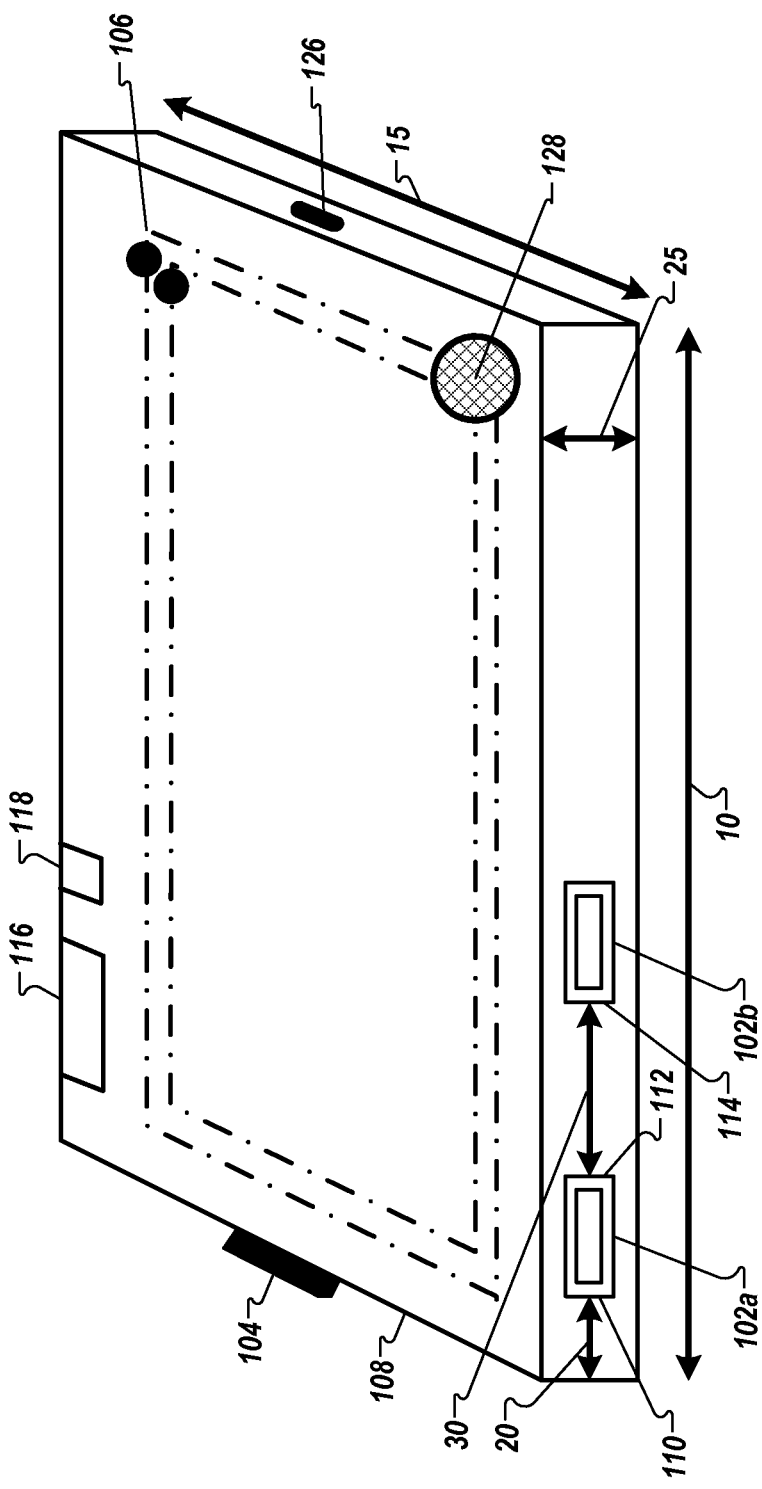
FIG. 1B is a diagram that illustrates an example operating system dongle from a side perspective view.

FIG. 1B is a diagram that illustrates the OS dongle 100 from a side perspective view.

FIG. 1C is a diagram that illustrates the example OS dongle 100 plugged into/connected to a display monitor 120.

FIG. 1D is a diagram that illustrates a detailed view of the example OS dongle 100 plugged into/connected to a display monitor 120.

Referring to FIGS. 1A and 1B, the OS dongle 100 can include a full operating system on a small device (e.g., the size of a credit card) that a user can easily carry. For example, in some implementations, a length 10 of the OS dongle 100 can be approximately 3.2 inches (e.g., between 3.0 inches and 3.4 inches). A width 15 of the OS dongle can be approximately 2.2 inches (e.g., between 2.0 inches and 2.4 inches). A height 25 of the OS dongle 100 can be approximately 0.5 inches (between 0.30 inches and 0.51 inches). For example, in some implementations, a length 10 of the OS dongle 100 can be approximately 2.5 inches (e.g., between 2.0 inches and 3.0 inches). A width 15 of the OS dongle can be approximately 1.2 inches (e.g., between 1.0 inch and 1.4 inches). A height 25 of the OS dongle 100 can be approximately 0.5 inches (between 0.30 inches and 0.51 inches). In some implementations, the height 25 of the OS dongle 100 can be dependent on the height of communication connectors 102a-b (first communication connector 102a and second communication connector 102b).

In some implementations, the communication connectors 102a-b can be the same type of connector. In some implementations, the first communication connector 102a can be a different type of connector than the second communication connector 102b. For example, the communication connectors 102a-b can be Universal Serial Bus (USB) connectors, receptacles, or ports. The USB receptacles can include, but are not limited to, USB A-type receptacles, USB B-type receptacles, micro-USB A receptacles, micro-USB B receptacles, micro-USB AB receptacles, USB five pin Mini-b receptacles, USB four pin Mini-b receptacles, USB 3.0 A-type receptacles, USB 3.0 B-type receptacles, USB 3.0 Micro B receptacles, and USB C-type receptacles.

As shown in FIG. 1C, a user can connect the OS dongle 100 to the display monitor 120 (e.g., a High-Definition Multimedia Interface (HDMI) port) by plugging (connecting) the display connector 104 into a display port 122 that can be a connector or receptacle for receiving the display connector 104. As shown in FIG. 1D, in many cases, a side 108 of the OS dongle 100 can be near flush with a side 124 of the display monitor 120. For example, a distance 30 between the side 124 of the display monitor 120 and the side 108 of the OS dongle 100 can be approximately 0.10 inches (e.g., between 0.05 inches and 0.15 inches).

Referring to FIGS. 1A-D, a first distance 20 between the side 108 of the OS dongle 100 and a first side 110 of the first communication connector 102a can be determined such that when a connector is plugged into (interfaced with) the first communications connector 102a, a housing surrounding the connector may not go beyond the side 108 of the OS dongle 100. For example, this can ensure that a cable that includes the connector and housing at one end can be easily plugged into (interfaced with) the first communication connector 102a without interfering with (coming in contact with) the side 124 of the display monitor 120. For example, the first distance 20 can be approximately 0.30 inches (e.g., between 0.25 inches and 0.35 inches).

Referring to FIGS. 1A-D, a second distance 35 between a second side 112 of the first communication connector 102a and a first side 114 of the second communication connector 102b can be determined such that when a first connector is plugged into (interfaced with) the first communications connector 102a and a second connector is plugged into (interfaced with) the second communications connector 102b, a first housing surrounding the first connector may not interfere with (come in contact with) a second housing surrounding the second connector. This can ensure that the first connector with the first housing can be easily plugged into (interfaced with) the first communication connector 102a without interfering with (coming in contact with) a second housing surrounding the second connector that may be plugged into (interfaced with) the second communication connector 102b (and vice versa). For example, the second distance 35 can be approximately 0.3 inches (e.g., between 0.25 inches and 0.35 inches).

Referring to FIGS. 1A-C, the OS dongle 100 can include a WiFi antenna 106. The OS dongle 100 can wirelessly interface with/connect to a network or other computing device using a WiFi (IEEE 802.11x) connection that interfaces with the WiFi antenna 106. In some implementations, the OS dongle 100 can include a transceiver that allows the OS dongle 100 to wirelessly interface with/connect to a cellular telecommunications network. In some implementations, the OS dongle 100 can wirelessly interface with/connect to another computing device using a WiFi or a type of Bluetooth connection. The other computing device (e.g., a mobile phone) can then access a cellular telecommunications network.

In some implementations, the connector (receptacle) for the display port 122 and the connector (receptacle) for the display connector 104 are implemented such that the display connector 104 can be plugged into the display port 122. In some implementations, the connector (receptacle) for the display port 122 is a male connector and the connector (receptacle) for the display connector 104 is a female connector. In some implementations, the connector (receptacle) for the display port 122 is a female connector and the connector (receptacle) for the display connector 104 is a male connector.

In some implementations, the OS dongle 100 can be connected to the display monitor 120 using a cable. The cable can include a first connector at a first end that properly mates with the type of connector (receptacle) for the display port 122 and a second connector at a second end that properly mates with the type of connector (receptacle) for the display monitor 120.

The OS dongle 100 can include a power connector 116, a microphone/headphone connector 118, a light emitting diode (LED) 126, and/or a power button 128. An external source of power for the OS dongle 100 can be connected to the power connector 116 (power receptacle or power plug). A microphone or headphone can be connected to the microphone/headphone connector 118 (microphone/headphone receptacle or microphone/headphone plug). For example, the LED 126 can be powered ON (emit light) when power is applied to the OS dongle 100 or when power is consumed by the OS dongle at a rate that exceeds a threshold rate. In addition or in the alternative, the LED 126 may blink (turn ON and OFF) at a particular rate to indicate a mode of operation of the OS dongle 100. For example, the LED 126 may blink at a first rate when the OS dongle 100 is attempting to complete a WiFi connection. In another example, the LED 126 may blink at a second rate when the OS dongle 100 is identifying and connecting to a Bluetooth device. A user can press the power button 128 (power switch) in order to provide or remove power from the OS dongle 100. The use of the power button 128 can allow the OS dongle 100 to remain connected to/plugged into the display monitor 120 when not in use.

Figure 2:
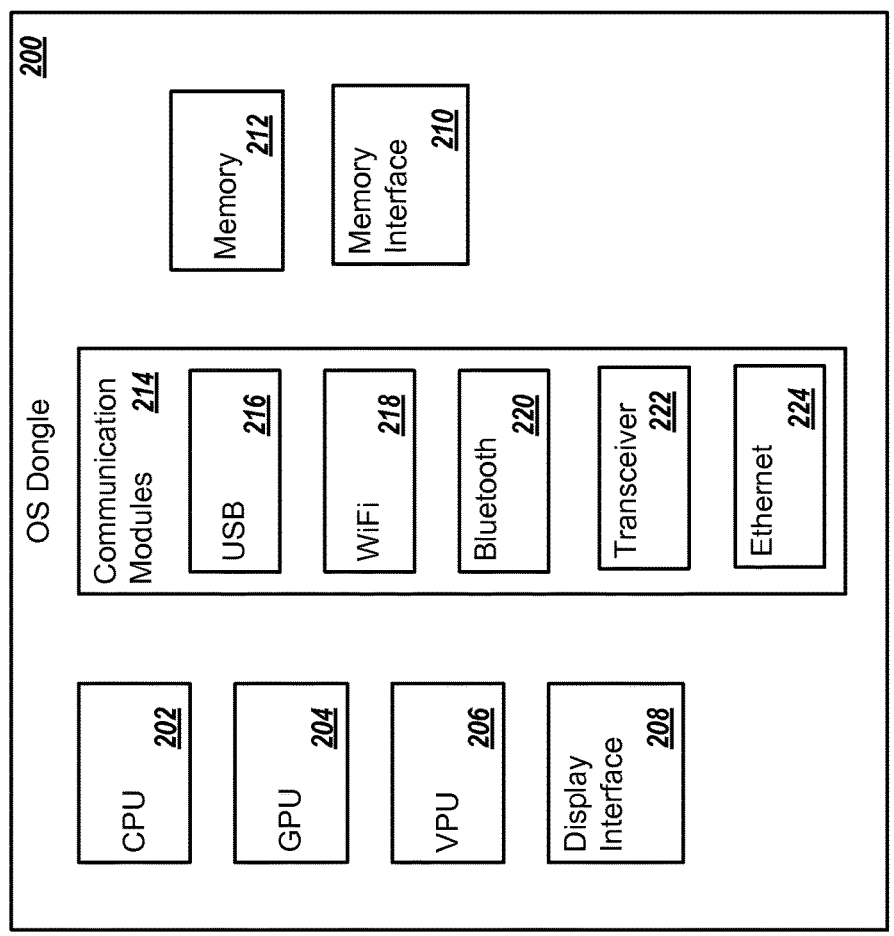
FIG. 2 is a block diagram showing the components included in an example operating system dongle.

FIG. 2 is a block diagram showing components included in an example operating system dongle 200. The OS dongle 200 can be the OS dongle 100 as shown in FIGS. 1A-D. The OS dongle 200 can incorporate sufficient computing power to run a full operating system on the OS dongle 200 along with sufficient memory to support the OS while allowing a user to locally buffer content and data securely. The OS dongle 200 can include circuity and software that enable the OS dongle 200 to connect to the cloud and/or to remote servers using a network. The OS dongle 200 can use WiFi or other wireless communications protocols to connect to a router or other computing device that can access a network. Using the network connection, the OS dongle 200 can interface with the cloud and/or one or more servers (e.g., a content server) in order to access and run cloud-based applications. In addition, the OS dongle 200 can obtain data, files and content remotely stored in the cloud or other remote servers (e.g., content servers).

The OS dongle 200 can include a central processing unit (CPU) 202, a graphics processing unit (GPU) 204, and/or a video processing unit (VPU) 206. The CPU 202 can perform general computing operations for the OS. The GPU 204 can perform graphics-specific operations such as image scaling and rotation. The VPU 206 can perform video encoding and decoding operations.

A display interface 208 can provide display data (e.g., video data, image data, streaming audio and video data) to an external display monitor via a display connector when the OS dongle 200 is interfaced with (plugged into) the display monitor. For example, referring to FIG. 1C, the display monitor 120 can receive display data via the display connector 104 when the OS dongle 100 is interfaced with (plugged into) the display port 122 on the display monitor 120.

In some implementations, the OS dongle 200 can connect to or be interfaced to a computing device that can provide or act as a display interface to an external display monitor. The computing device can be a mobile computing device that can act as a casting device by receiving data (content) from the OS dongle 200 and, using the display interface, can provide the data (content) to the external display monitor. In some cases, the OS dongle 200 can communicate with (connect to or interface with) the computing device wirelessly using at least one type of wireless interface described herein. In these implementations, the OS dongle 200 may not include the display interface 208, as the computing device acts as or provides the functions of the display interface.

A memory interface 210 can provide an interface between memory 212 and the CPU 202, the GPU 204, the VPU 206, the display interface 208 and communication modules 214. The communication modules 214 can include, but are not limited to, a USB communication module 216, a WiFi communication module 218, a Bluetooth communication module 220, a transceiver 222, and an Ethernet (e.g., IEEE 802.3) communication module 224. In some implementations, the OS dongle 200 may include all of the communication modules 214. In some implementations, the OS dongle 200 may include less than all of the communication modules 214. For example, the OS dongle may include the USB communication module 216, the WiFi communication module 218, and the Bluetooth communication module 220. The communication modules 214 can be used to establish connections and communication between the OS dongle 200 and one or more external networks and/or devices. For example, the WiFi communication module 218 can interface with a WiFi antenna included on the OS dongle 200 (e.g., the WiFi antenna 106 included on the OS dongle 100). The transceiver 222 can be used to wirelessly interface/connect the OS dongle 200 to a cellular telecommunications network (a cellular data network).

In some implementations when the OS dongle 200 includes the Ethernet communication module 224, the OS dongle 200 can further include an Ethernet port (receptacle or connector) (e.g., an RJ-45 connector). One end of an Ethernet cable can be plugged into the Ethernet connector on the OS dongle 200. The other end of the Ethernet cable can be plugged into, for example, an Ethernet port on a router (e.g., a broadband router), or an uplink port on a broadband modem (e.g., a wide area network (WAN) port). The router or modem can provide a connection to a network.

In some implementations, referring to FIG. 1, the OS dongle 200 can be connected, using a communication port (e.g., one of the communication ports 102a-b), to an external Ethernet dongle. The external Ethernet dongle can then be connected to a network. For example, one end of an Ethernet cable can be plugged into an Ethernet connector included in the Ethernet dongle 200 and other end of the Ethernet cable can be plugged into, for example, an Ethernet port on a router or an uplink port on a broadband modem.

Figure 3:
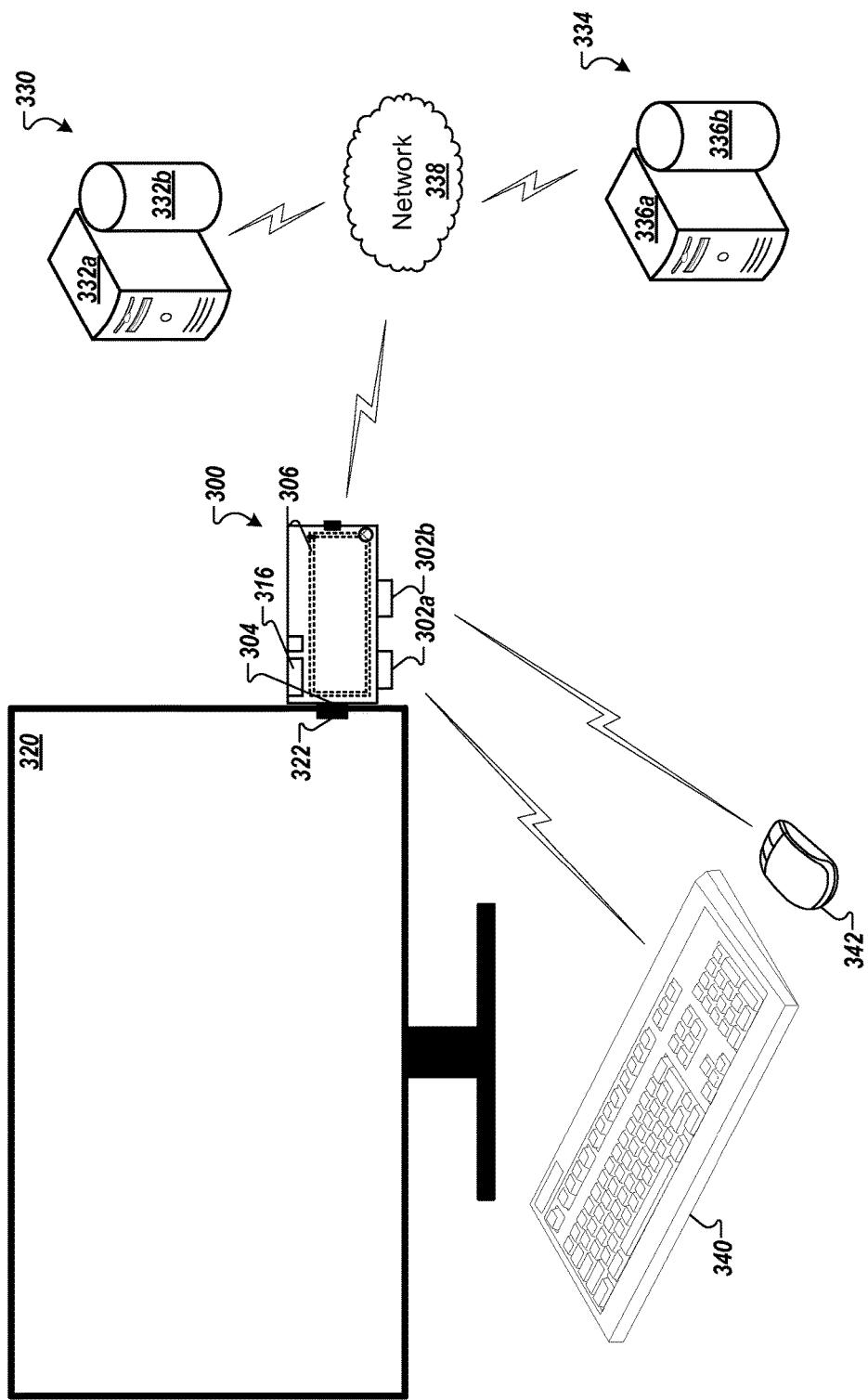
FIG. 3 is a diagram that illustrates the use of an operating system dongle with a display monitor, a keyboard, and a mouse.

FIG. 3 is a diagram that illustrates the use of an OS dongle 300 with a display monitor 320, a keyboard 340, and a mouse 342. The OS dongle 300 can be the OS dongle 100 as shown in FIGS. 1A-D or the OS dongle 200 as shown in FIG. 2. As shown in FIG. 3, a user can connect the OS dongle 300 to the display monitor 320 by plugging the display connector 304 into a port 322 (e.g., a High-Definition Multimedia Interface (HDMI) port) included in the display monitor 320. In some implementations, the OS dongle 300 can connect to/interface with the display monitor 320 using a wireless connection. In these implementations, the OS dongle 300 may not include the display connector 304 and/or the display monitor 320 may not include the port 322.

The user may also connect a power source to a power connector 316. In some implementations, the power source may be provided by the display monitor 320. A user may connect a cable between the power connector 316 and a port on the display monitor 320 that can provide a source of power. In some implementations, a user may connect a power converter to the power connector 316. The power converter can be plugged into a source of AC power (e.g., a wall outlet) and can convert the AC power to the DC power needed by the OS dongle 300. A cable can connect the DC power output by the power converter to the OS dongle 300. One end of the cable can plug into the power converter and the other end of the cable can plug into the power connector 316. In some implementations, the power connector 316 can be a USB receptacle (e.g., a micro USB receptacle) that can be connected to micro USB charger/power adapter. For example, a micro USB charger/power adapter can supply five volts and three amperes of power to the OS dongle 300. The power adapter can be plugged into a wall outlet that supplies AC power to an AC/DC converter that generates the five volts/three amperes.

The OS dongle 300 can connect to one or more computer systems (e.g., computer system 330 and computer system 334) by way of a network 338 using a WiFi or other type of wired/wireless communication protocol connections as described herein. The computer system 330 can include one or more computing devices (e.g., server 332a) and one or more computer-readable storage devices (e.g., repository 332b). The computer system 334 can include one or more computing devices (e.g., server 336a) and one or more computer-readable storage devices (e.g., repository 336b). The OS dongle 300 can communicate with the computer systems 330, 334 (and the computer systems 330, 334 can communicate with the OS dongle 300) using the network 338. For example, referring to FIG. 2, the WiFi communication module 218 can communicate wirelessly with a network 338 using a WiFi antenna 306.

In some implementations, each computer system 330, 334 can represent more than one computing device working together to perform server-side operations. For example, though not shown in FIG. 3, multiple servers working together can perform server-side operations. In some cases, a single proprietor can provide the multiple servers. In other cases, the one or more of the multiple servers can provide other functionalities for the proprietor. In a non-limiting example, a computer system (e.g., the computer system 330) can also include a search server and a web crawler server. A computer system (e.g., the computer system 334) can be a content server. Various types of content can be stored in the repository 336b and provided to the OS dongle 300 by way of the network 338.

In some implementations, the network 338 can be a public communications network (e.g., the Internet, cellular data network, dialup modems over a telephone network) or a private communications network (e.g., private LAN, leased lines). In some implementations, the OS dongle 300 can communicate with the network 338 using one or more high-speed wireless communications protocols (e.g., 802.11 variations, WiFi, Bluetooth, Transmission Control Protocol/Internet Protocol (TCP/IP), Ethernet, IEEE 802.3, etc.).

In some implementations, the OS dongle 300 can recognize and connect to the keyboard 340 and the mouse 342 using a wireless communication system and protocol such as Bluetooth or Bluetooth Low Energy (Bluetooth LE). A Bluetooth/Bluetooth LE enabled device can frequently "search" for other Bluetooth/Bluetooth LE enabled devices to connect to. For example, the OS dongle 300, using Bluetooth, can recognize a Bluetooth-enabled keyboard (e.g., the keyboard 340) and a Bluetooth-enabled mouse (e.g., the mouse 342) and connect to each device.

In some implementations, the OS dongle 300 can connect to the keyboard 340 and/or the mouse 342 using a wired connection such as USB. For example, a USB cable can connect the keyboard 340 to a first communication connector 302a and a USB cable can connect the mouse 342 to a second communication connector 302b. In some implementations, for example, the OS dongle 300 can connect to the keyboard 340 using a nano transceiver that plugs into/ connects to either the first communication connector 302a or the second communication connector 302b. In a similar manner, for example, the OS dongle 300 can connect to the mouse 342 using a nano transceiver that plugs into/connects to either the first communication connector 302a or the second communication connector 302b.

In some implementations, one or more peripheral devices can be plugged into (interfaced with) the OS dongle 300. For example, referring to FIG. 3, the OS dongle 300 can connect to the keyboard 340 and the mouse 342 using WiFi. A user can connect a USB flash drive to the first communication connector 302a. The flash drive can include applications and data for use by the OS dongle 300. In these implementations, a user may not need to connect the keyboard 340 and/or the mouse 342 to the OS dongle 300. The touchscreen may be capable of providing the input that could be provided by the keyboard 340 and the mouse 342.

In some implementations, the display monitor 320 can be a touchscreen. A cable and/or connector included with the display monitor 320 can plug into (interface with) the first communication connector 302a or the second communication connector 302b to provide the input from the touchscreen to the OS dongle 300.

A user can interface/plug in the OS dongle 300 to any display monitor that can accept the display connector 304. Once connected, the user can utilize one or more standard, off-the-shelf available peripherals (e.g., a wireless keyboard, a wireless mouse, a USB keyboard, a USB mouse, a flash drive, an external USB hard drive, etc.) that can interface with the OS dongle 300. In some cases, the peripherals can interface to the OS dongle 300 wirelessly using a wireless communication protocol such as WiFi or Bluetooth. In some cases, the peripherals can be interface to the OS dongle 300 using wired connections (e.g., USB) to the communication connectors 302a-b.

Referring to FIGS. 2 and 3, the OS dongle 300 can run an operating system on the OS dongle 300 using the CPU 202, GPU 204, and the VPU 206. For example, the OS dongle 300 can include sufficient computing power and memory in order to run the operating system on the OS dongle 300. In effect, the OS dongle 300 can provide the "brains" needed to create a computing device that includes just the display monitor 320, the keyboard 340 and the mouse 342.

In a non-limiting example, the memory 212 can include one or more of dynamic random access memory (DRAM), static random access memory, non-volatile random access memory (NVRAM) and other types of persistent memory storage such as a solid-state drive (SSD), flash memory, MultiMediaCard (MMC) and an embedded MMC (eMMC). In some implementations, the OS dongle 300 can store an operating system in the NVRAM. In some implementations, the OS dongle 300 may also use and run a virtual operating system provided from the cloud. For example, the OS dongle 300 can store an operating system in memory 212 (e.g., NVRAM) that may not include a desktop user interface. The running of the virtual operating system in the cloud can provide the desktop user interface.

An owner of the OS dongle 300 can become a registered user and cloud administrator for the OS dongle 300. For example, the owner can register the OS dongle 300 with a cloud service or a web service provider. The user can control the operation of the OS dongle 300 using services provided by the cloud service or web service provider. The OS dongle 300 can then access and run applications, virtual operating systems, and other software included in the cloud. In addition, the OS dongle 300 can access content in the cloud for display on the display monitor 320. In some cases, the OS dongle 300 can download the content locally to the OS dongle 300 for storage in persistent memory included in the OS dongle 300. In these cases, the OS dongle 300 can display the content when the OS dongle 300 is offline (not connected to the network 338).

A registered user of the OS dongle 300 can control the content and mode(s) of operation of the OS dongle 300. A registered user of the OS dongle 300 can control what content other users of the OS dongle 300 can access. A registered user of the OS dongle 300 can control what mode(s) of operation the OS dongle 300 can run in for each specific user of the OS dongle 300.

Figure 4:
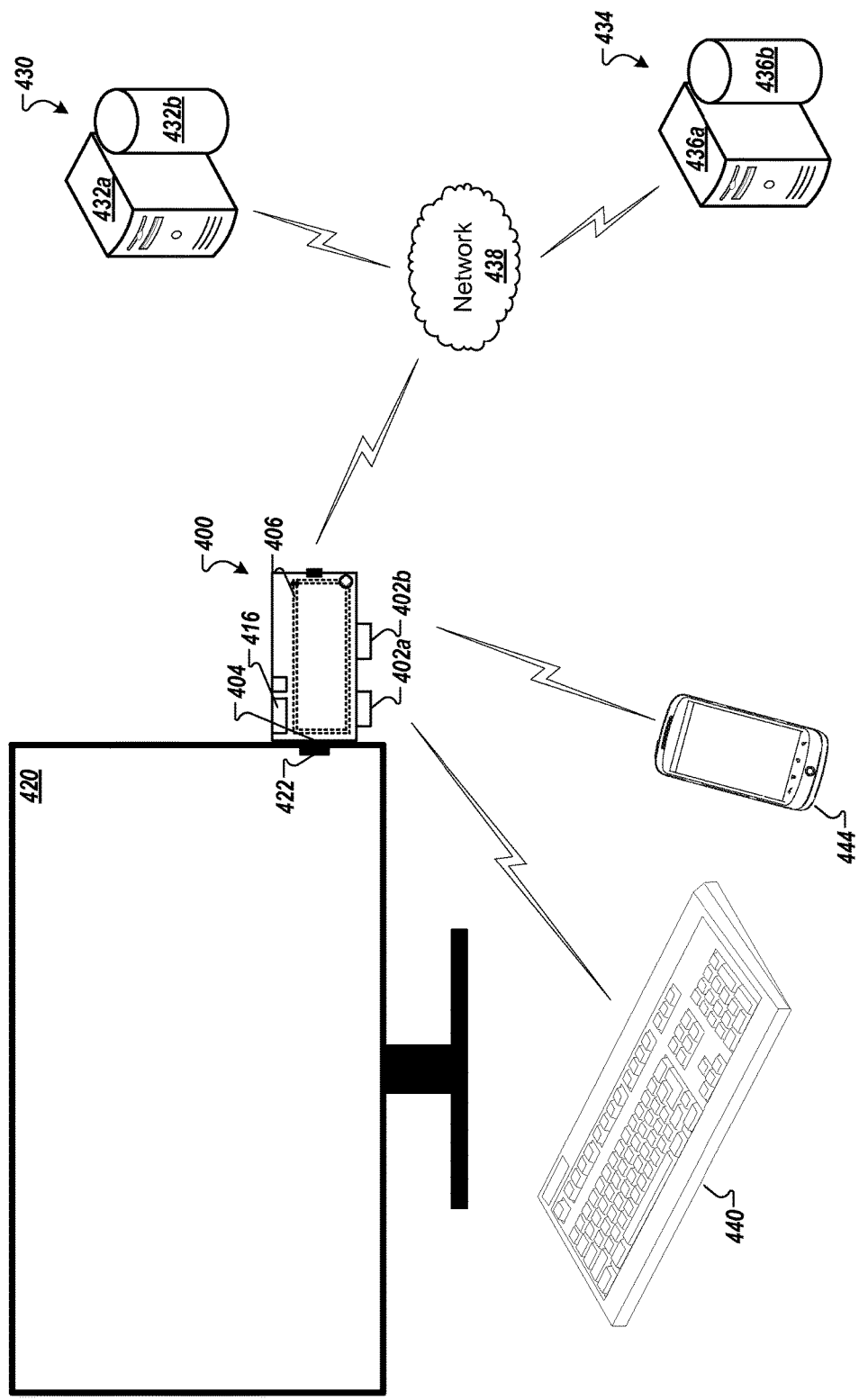
FIG. 4 is a diagram that illustrates the use of an operating system dongle with a display monitor, a keyboard, and a mobile device.

FIG. 4 is a diagram that illustrates the use of an operating system dongle 400 with a display monitor 420, keyboard 440, and a mobile device 444. The mobile device 444 can include, but is not limited to, a tablet computing device, a smartphone, and a personal digital assistant. The OS dongle 400 can be the OS dongle 100 as shown in FIGS. 1A-D or the OS dongle 200 as shown in FIG. 2. As shown in FIG. 4, a user can connect the OS dongle 400 to the display monitor 420 by plugging the display connector 404 into a port 422 (e.g., a High-Definition Multimedia Interface (HDMI) port) included in the display monitor 420. The OS dongle 400 can operate in a similar manner as the OS dongle 300 as shown in FIG. 3.

The OS dongle 400 can connect to one or more computer systems (e.g., computer system 430 and computer system 434) by way of a network 438 using a WiFi or other type of wired/wireless communication protocol connections described herein. The computer system 430 can include one or more computing devices (e.g., server 432a) and one or more computer-readable storage devices (e.g., repository 432b). The computer system 434 can include one or more computing devices (e.g., server 436a) and one or more computer-readable storage devices (e.g., repository 436b). The OS dongle 400 can communicate with the computer systems 430, 434 (and the computer systems 430, 434 can communicate with the OS dongle 400) using the network 438. For example, referring to FIG. 2, the WiFi communication module 218 can communicate wirelessly with a network 438 using a WiFi antenna 406.

The OS dongle 400 can operate in a similar manner as the OS dongle 300 described with reference to FIG. 3. For example, the user may also connect a power source to a power connector 416 in a similar manner as described with reference to FIG. 3. In some implementations, each computer system 430, 434 can represent more than one computing device working together to perform server-side operations in a similar manner as each computer system 330, 334 as described with reference to FIG. 3.

In some implementations, the network 438 can be a network similar to the network 338 as described with reference to FIG. 3. In some implementations, the OS dongle 400 can recognize and connect to the keyboard 440 using a wireless communication system and protocol such as Bluetooth or Bluetooth Low Energy (Bluetooth LE). The OS dongle 400, using Bluetooth, can recognize a Bluetooth-enabled keyboard (e.g., the keyboard 440). In addition, in some implementations, the OS dongle 400 can recognize and connect to the mobile device 444 using a wireless communication system and protocol such as Bluetooth or Bluetooth Low Energy (Bluetooth LE). In some implementations, the OS dongle 400 can connect to the mobile device 444 using a WiFi connection. In some implementations, the OS dongle 400 can connect to the keyboard 440 using a wired connection such as USB. For example, a USB cable can connect the keyboard 440 to a first communication connector 402a.

When using the OS dongle 400 in the configuration shown in FIG. 4, the mobile device 444 can provide a similar interface as that provided by the mouse 342 in the configuration shown in FIG. 3.

The OS dongle 400 can be self-configuring. For example, when plugged into the display monitor 420, the OS dongle 400 can discover and connect to the keyboard 440 and the mobile device 444. Based on making these connections, the OS dongle 400 can be configured to run the operating system in a full computer mode, using the mobile device 444 as a type of mouse input device (e.g., a pointing device).

In some implementations, the display monitor 420 can be a touchscreen. A cable and/or connector included with the display monitor 420 can plug into (interface with) the first communication connector 402a or the second communication connector 402b to provide the input from the touchscreen to the OS dongle 400. In these implementations, a user may not need to connect the keyboard 440 as the touchscreen may be capable of providing the input that could be provided by the keyboard 440. The mobile device 444 can provide other input to the OS dongle 400 (e.g., a verification code) that can be used to verify the use of the OS dongle 400 by the user.

FIG. 5A is a diagram that illustrates the use of an operating system dongle 500 with a display monitor 520 and a mobile device 544. The mobile device 544 can include, but is not limited to, a tablet computing device, a smartphone, and a personal digital assistant. The OS dongle 500 can be the OS dongle 100 as shown in FIGS. 1A-D or the OS dongle 200 as shown in FIG. 2. As shown in FIG. 5A, a user can connect the OS dongle 500 to the display monitor 520 by plugging the display connector 504 into a port 522 (e.g., a High-Definition Multimedia Interface (HDMI) port) included in the display monitor 520.

The OS dongle 500 can connect to one or more computer systems (e.g., computer system 530 and computer system 534) by way of a network 538 using a WiFi or other type of wired/wireless communication protocol connections as described herein. The computer system 530 can include one or more computing devices (e.g., server 532a) and one or more computer-readable storage devices (e.g., repository 532b). The computer system 534 can include one or more computing devices (e.g., server 536a) and one or more computer-readable storage devices (e.g., repository 536b). The OS dongle 500 can communicate with the computer systems 530, 534 (and the computer systems 530, 534 can communicate with the OS dongle 500) using the network 538. For example, referring to FIG. 2, the WiFi communication module 218 can communicate wirelessly with a network 538 using a WiFi antenna 506.

A user can connect a power source to a power connector 516 in a similar manner as described with reference to the OS dongle 300 as shown in FIG. 3. In some implementations, each computer system 530, 534 can represent more than one computing device working together to perform server-side operations in a similar manner as each computer system 330, 334 as described with reference to FIG. 3.

In some implementations, the network 538 can be a network similar to the network 338 as described with reference to FIG. 3. In some implementations, the OS dongle 500 can recognize and connect to the mobile device 544 using a wireless communication system and protocol such as Bluetooth or Bluetooth Low Energy (Bluetooth LE). In some implementations, the OS dongle 500 can connect to the mobile device 544 using a WiFi connection. The mobile device 544 can provide input to the OS dongle 500 for use in controlling the operations of the OS dongle 500.

In some implementations, a user verification code can be provided to the mobile device 544 (e.g., the mobile device 544 can receive a short message service (SMS) message with the verification code) for use in authenticating the user of the OS dongle 500. The user can provide the verification code received by the mobile device 544 to the OS dongle 500.

In some implementations, a user may use a security key for use in authenticating the use of the OS dongle 500. In some implementations, a user may use near field communication (NFC) with the security key when authenticating the use of the OS dongle 500. In some implementations, a user can use an NFC enabled one time password (OTC) token (security key) when authenticating the use of the OS dongle 500. Once authenticated for use, the user may access settings and change their user settings accordingly. In cases where the user is the owner of the OS dongle 500, the owner may access their user settings to update the listing of the users authorized to use the OS dongle 500 along with what each user is authorized to do with the OS dongle 500.

In some implementations, the mobile device 544 can provide input to the OS dongle 500 in a manner similar to the input provided by a keyboard and/or a mouse. For example, a soft keyboard/keypad can be displayed on a display 546 of the mobile device 544. Interactions of the user with the soft keyboard/keypad can be provided to the OS dongle 500. In addition or in the alternative, the mobile device 544 can be used as a mouse or pointing device for interacting with content displayed on the display monitor 520. In some implementations, the display monitor 520 can be a touchscreen. A cable and/or connector included with the display monitor 520 can plug into (interface with) a first communication connector 502a or a second communication connector 502b to provide the input from the touchscreen to the OS dongle 500.

In some implementations, the OS dongle 500 can be placed in a kiosk mode of operation. For example, the display monitor 520 can display information provided by a limited number of applications. In addition, the OS dongle 500 may accept a limited amount of input. As such, there may be little or no need for peripheral input devices for interfacing to the OS dongle 500. For example, the OS dongle 500 can run a weather application that is provided from, or hosted in, the cloud. The weather application can provide weather conditions for one or more locations for display on the display monitor 520. In another example, the OS dongle 500 can run an airline flight schedule application provided from, or hosted in, the cloud. The airline flight schedule application can provide a continual update of flight schedules (arrival and departure times) at a particular airport for display on the display monitor 520.

In some implementations, the OS dongle 500 can be powered up and plugged into/interfaced with the display monitor 520 and can boot up (initialize) into a preconfigured kiosk mode of operation. In the kiosk operating mode, the OS dongle 500 can boot up and start the operating system, and connect to the computing systems 530, 534 by connecting to the network 538 using a WiFi connection that utilizes the WiFi antenna. A user code can be provided to the mobile device 544 (e.g., the mobile device 544 can receive a short message service (SMS) message with the code) for use in authenticating the user of the OS dongle 500. The user can provide the verification code received by the mobile device 544 to the OS dongle 500. Once authenticated, the OS dongle 500 can begin a kiosk operating mode.

Figure 5B:
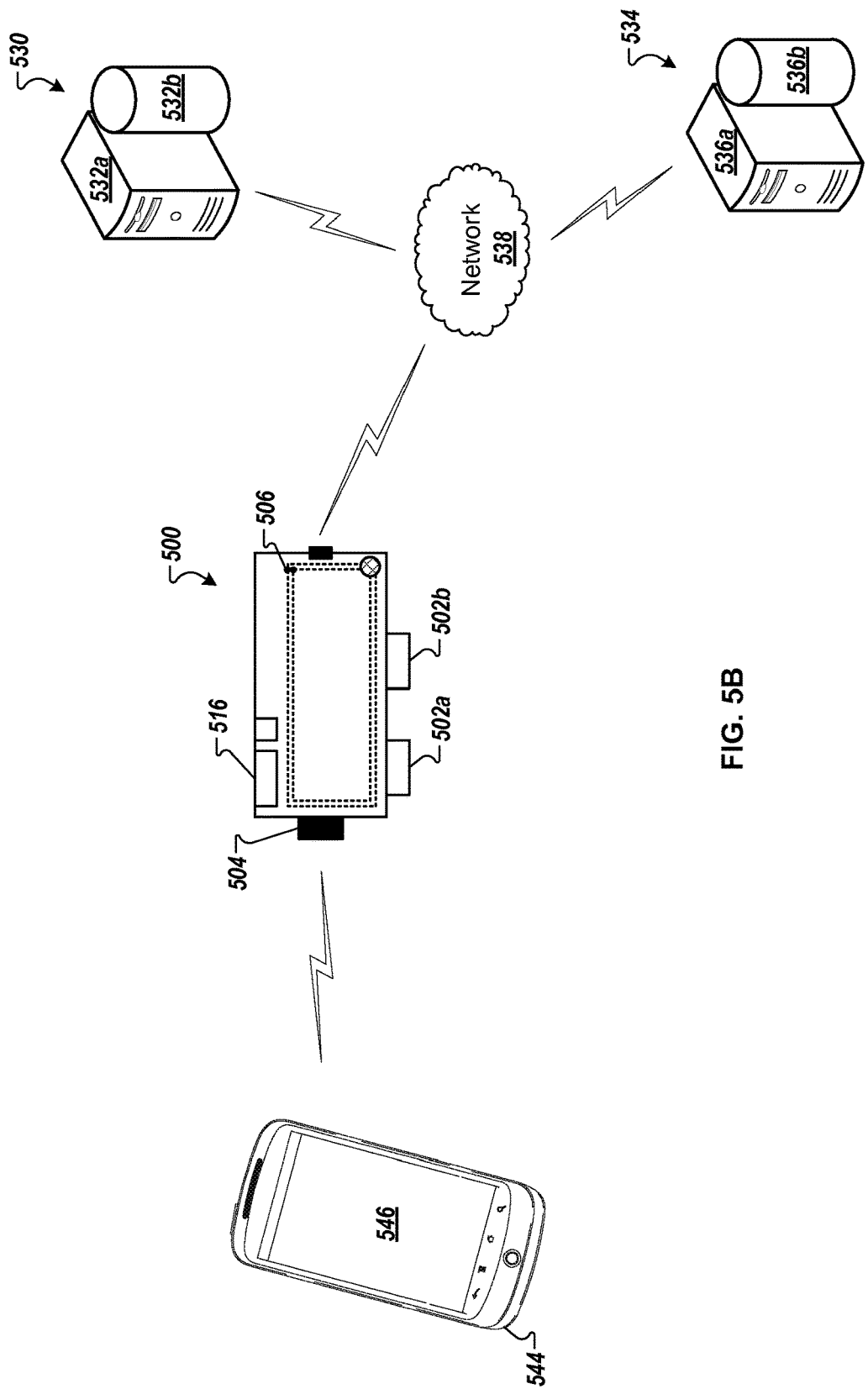
FIG. 5B is a diagram that illustrates the use of an operating system dongle 500 with a mobile device.

FIG. 5B is a diagram that illustrates the use of the operating system dongle 500 with the mobile device 544. As described, the mobile device 544 can include, but is not limited to, a tablet computing device, a smartphone, and a personal digital assistant. The mobile device 544 can communicate with external devices using one or more types of wireless communication protocols (e.g., WiFi, Bluetooth, Bluetooth LE). The OS dongle 500 can also communicate with external devices using one or more types of wireless communication protocols (e.g., WiFi, Bluetooth, Bluetooth LE).

In the example shown in FIG. 5B, the mobile device 544 may not include a display port. In addition or in the alternative, the OS system dongle 500 may not include a display connector. The mobile device 544 may communicate with (interface to) the OS dongle 500 using one or more wireless connections to receive content, image, and/or data files from the cloud or some type of server remote from the mobile device 544 (e.g., servers 532a and 536a). The mobile device 544 can include a video processor/decoder that can process video and image content received from the OS dongle 500. The OS dongle 500 can improve the performance to the mobile device 544 because the OS dongle 500 can be capable of increased computing power compared to the computing power of the mobile device 544. In addition or in the alternative, the computing power of the mobile device 544 can be used for displaying content while the computing power of the OS dongle 500 can be used for computational improvements to applications running on the cloud and/or the mobile device 544.

Figure 6A:
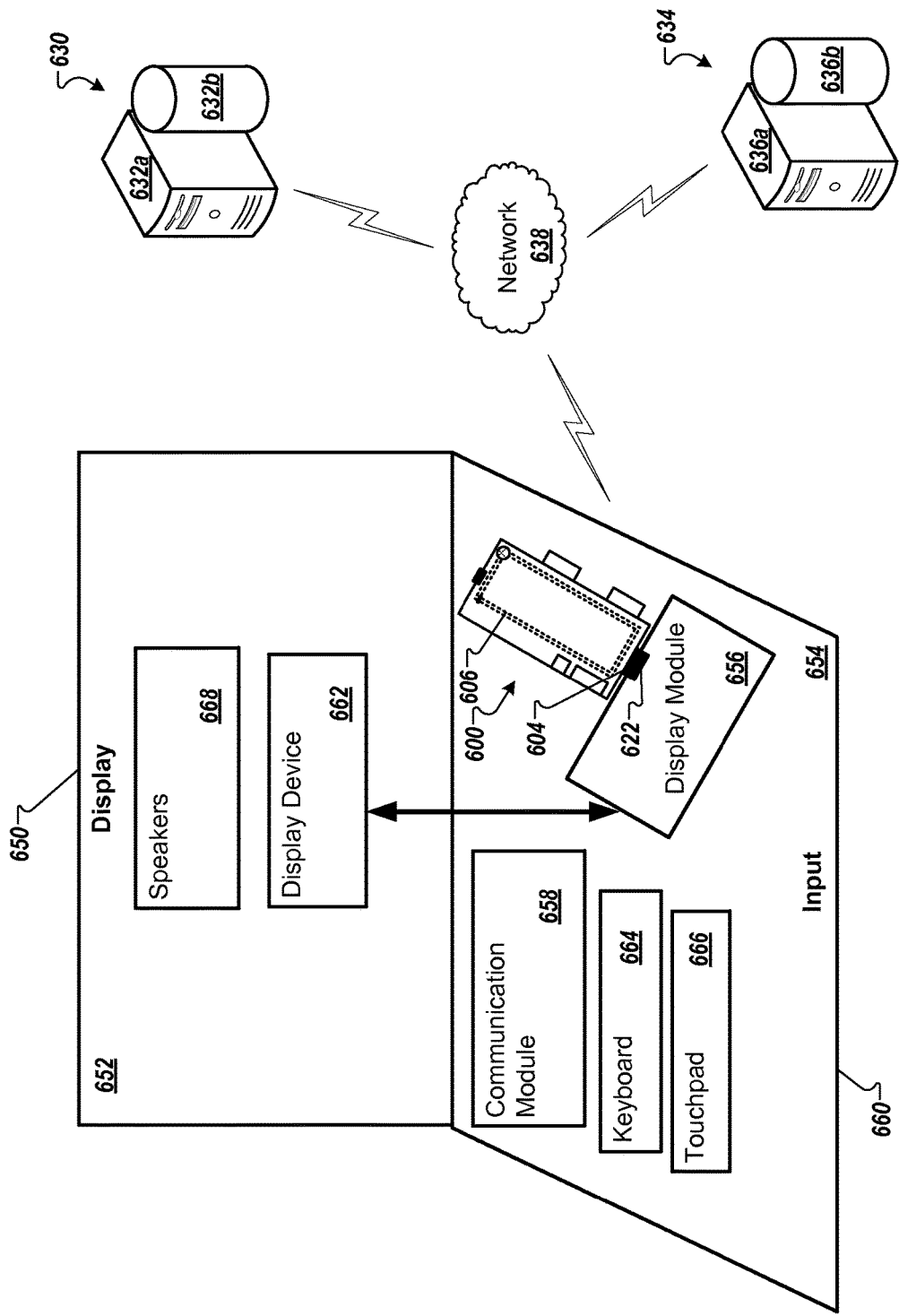
FIG. 6A is a diagram that illustrates the use of an operating system dongle with a cast terminal.

FIG. 6A is a diagram that illustrates the use of an operating system dongle 600 with a cast terminal 650. The cast terminal 650 can include a display component 652 integrated with an input component 654 housed in an enclosure 660. The cast terminal 650 can include a display device 662 as an output device that is included in the display component 652. The cast terminal 650 can include one or more speakers 668 as additional output devices.

The cast terminal 650 can include a keyboard 664 an as input device along with a trackpad and/or touchpad 666 that are included in the input component 654. The cast terminal 650 can include hardware needed to interface with the display device 662, the one or more speakers 668, the keyboard 664, and the trackpad and/or touchpad 666. The cast terminal 650 can communicate with external devices using one or more types of wireless communication protocols (e.g., WiFi, Bluetooth, Bluetooth LE). The cast terminal 650 can include hardware components for implementing the communication interfaces (e.g., a communication module 658). The cast terminal 650 can include electrical components needed to operate the hardware included on the device (e.g., the display device 662, the speakers 668, the keyboard 664, and the trackpad and/or touchpad 666). The cast terminal can include a battery.

Compared to a more traditional type of computing device that can include storage devices, and many other additional input devices, output devices, and sensors, the cast terminal 650 can be considered a type of stateless laptop computing device (and can also be referred to as a minimized laptop computing device) because the cast terminal 650 may not include (e.g., excludes) a central processing unit (CPU). The cast terminal 650 can cost much less that a more traditional type of computing device as it can include fewer components and features. In some implementations, the cast terminal 650 can include a low power, low cost, minimal performance processor (or equivalent circuitry) for use in initializing one or more modules and interfaces included in the cast terminal 650.

The OS dongle 600 can be the OS dongle 100 as shown in FIGS. 1A-D or the OS dongle 200 as shown in FIG. 2. As shown in FIG. 6A, the OS dongle 600 can be plugged into (interface with) the cast terminal 650. In some implementations, the OS dongle 600 can be inserted and removed from the cast terminal 650 by way of a slot or access opening included in the cast terminal 650. For example, the OS dongle 600 can be placed into a slot or opening included in the input component 654 of the cast terminal 650. A user can connect the OS dongle 600 to the cast terminal 650 by plugging the display connector 604 into a port 622 (e.g., a High-Definition Multimedia Interface (HDMI) port) included in a display module 656. The OS dongle 600 once plugged into (connected to) the cast terminal 650 is located behind (underneath) the input component 654 (e.g., behind (in back of) the keyboard 664 and/or the trackpad and/or touchpad 666).

Referring to FIGS. 2 and 3, the OS dongle 600 can run an operating system on the OS dongle 600 using the CPU 202, GPU 204, and the VPU 206. For example, the OS dongle 600 can include sufficient computing power and memory in order to run the operating system on the OS dongle 600. The OS dongle 600 can provide the "brains" needed by the cast terminal 650 (e.g., the OS dongle 600 can provide the central computing power the cast terminal 650 lacks) to create a computing device with similar capabilities as a laptop or notebook computing device.

The OS dongle 600 can connect to one or more computer systems (e.g., computer system 630 and computer system 634) by way of a network 638 using a WiFi or other type of wireless communication protocol connection. The computer system 630 can include one or more computing devices (e.g., server 632a) and one or more computer-readable storage devices (e.g., repository 632b). The computer system 634 can include one or more computing devices (e.g., a content server 636a) and one or more computer-readable storage devices (e.g., a content repository 636b). The OS dongle 600 can communicate with the computer systems 630, 634 (and the computer systems 630, 634 can communicate with the OS dongle 600) using the network 638. For example, referring to FIG. 2, the WiFi communication module 218 can communicate wirelessly with a network 638 using a WiFi antenna 606.

The communication module 658 can be capable of unidirectional and/or bidirectional communication. The communication module 658 can transmit keystroke data from the keyboard 664 to the OS dongle 600 using a wireless communication protocol (e.g., Bluetooth, Bluetooth LE, WiFi). The communication module 658 can also transmit trackpad data (e.g., a coordinate) from the trackpad and/or touchpad 666 to the OS dongle 600 using a wireless communication protocol (e.g., Bluetooth, Bluetooth LE, WiFi). In some implementations, the input component 654 can include a pointing device (e.g., a mouse). The communication module 658 can transmit data from the pointing device to the OS dongle 600 using a wireless communication protocol (e.g., Bluetooth, Bluetooth LE, WiFi). In some implementations, the input component 654 may allow one or more external devices (devices external to the cast terminal 650) to be connected to/interfaced with the cast terminal 650 using the communication module 658. In these implementations, the communication module 658 may communicate unidirectionally and/or bidirectionally with the external device. For example, a user may connect/plug-in an external input device (e.g., a mouse) to the cast terminal 650.

The display device 662 can include, but is not limited to, a liquid crystal display (LCD), a light emitting diode (LED) display, a plasma display, or a cathode ray tube (CRT) display. The display module 656 can receive audio and/or video data (e.g., streaming video data) from the OS dongle 600. The received video data can be encoded in a format that can be decoded by, for example, a System on a Chip (SoC) included in the display component 652. The SoC can include codecs for hardware decoding of one or more video compression formats (e.g., V8, H.264/MPEG-4 Advanced Video Coding (AVC), composite video (CVBS) (e.g., NTSC, PAL, SECAM), S-Video, component video, video graphics array (VGA), super VGA (sVGA)). The decoded video data can be converted into signals needed to drive the display device. For example, a low-voltage differential signaling (LVDS) LCD-panel interface can provide received streaming video to an LCD-panel timing controller included in an LCD device. In addition, the decoded video data can be converted into signals that can be provided to an audio output device (a speaker).

The OS dongle 600 can access a content server 634 using the network 638 to obtain content requested by a user of the cast terminal 650. For example, the OS dongle 600 can receive keystroke data (and other input data) sent by the communication module 658. The OS dongle 600 can interpret the keystroke data to identify content requested by a user of the cast terminal 650.

Figure 6B:
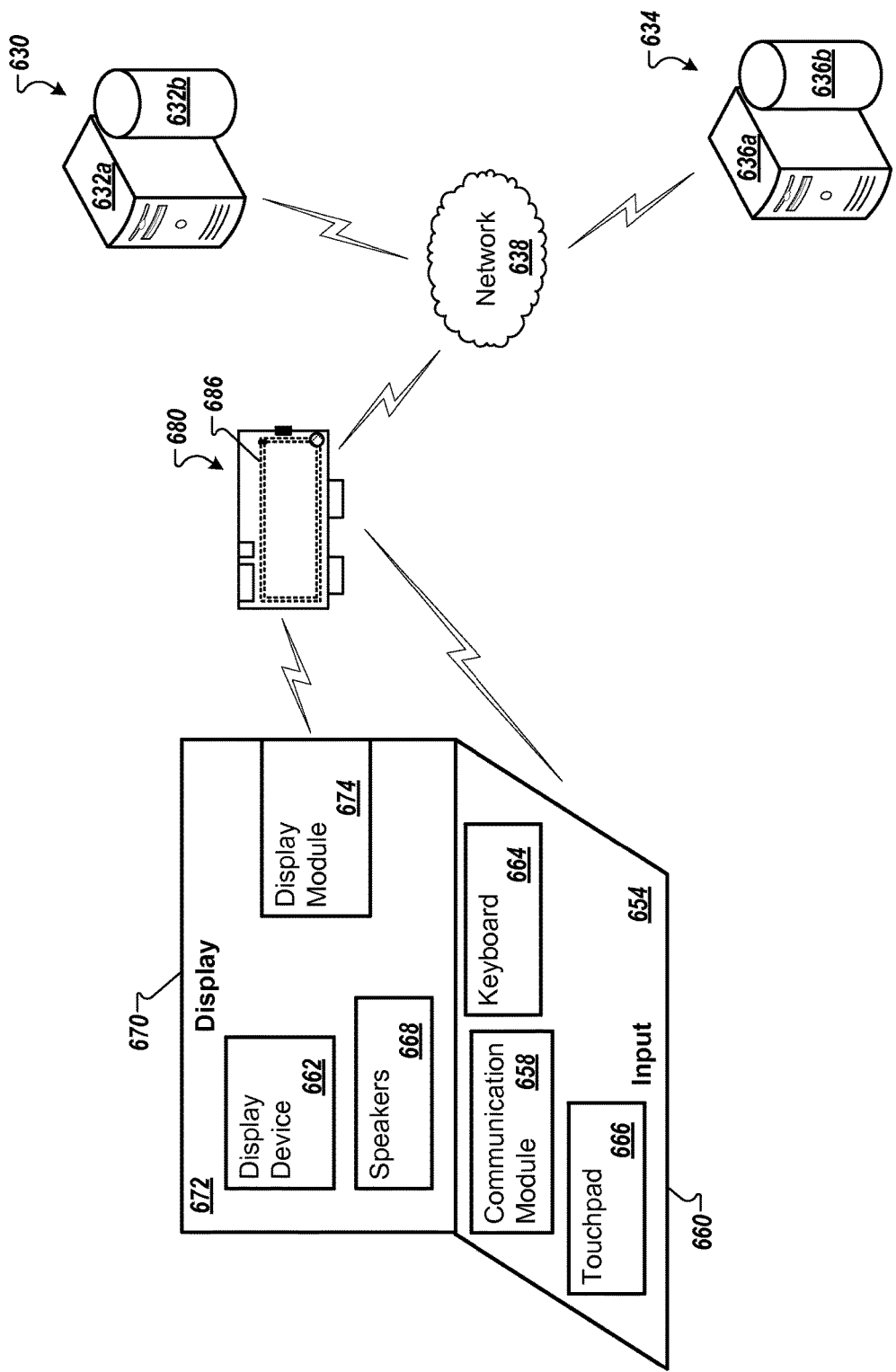
FIG. 6B is a diagram that illustrates an alternate use of an operating system dongle with a cast terminal.

FIG. 6B is a diagram that illustrates an alternate use of an operating system dongle 680 with a cast terminal 670. The cast terminal 670 is similar to the cast terminal 650 as described with reference to FIG. 6A. The cast terminal 670 includes a display component 672 that includes a display module 674. The OS dongle 680 can be the OS dongle 100 as shown in FIGS. 1A-D or the OS dongle 200 as shown in FIG. 2 without the inclusion of the display port 104.

The cast terminal 670 can communicate with external devices using one or more types of wireless communication protocols (e.g., WiFi, Bluetooth, Bluetooth LE). In the example shown in FIG. 6B, the cast terminal 670 may not include a port (e.g., the display module 664 may not include a port). In addition or in the alternative, the OS system dongle 680 may not include a display connector. The cast terminal 650 may communicate with (interface to) the OS dongle 680 using one or more wireless connections to receive content, image, and/or data files from the cloud or some type of server remote from the cast terminal 670. In a similar manner, the OS dongle 680 can provide the "brains" needed by the cast terminal 670 (e.g., the OS dongle 680 can provide the central computing power the cast terminal 670 lacks) to create a computing device with similar capabilities as a laptop or notebook computing device.

The OS dongle 680 can connect to the one or more computer systems (e.g., computer system 630 and computer system 634) by way of a network 638 using a WiFi or other type of wireless communication protocol connection. The OS dongle 500 can communicate with the computer systems 630, 634 (and the computer systems 630, 634 can communicate with the OS dongle 600) using the network 638. For example, referring to FIG. 2, the WiFi communication module 218 can communicate wirelessly with a network 638 using a WiFi antenna 686. Referring to the examples described with reference to FIGS. 3-5, and 6A-B, in some implementations, the same OS dongle can be used in all of the examples scenarios described in FIGS. 3-6 and, in some cases, by multiple users of the OS dongle. For example, the owner of an OS dongle can be considered the cloud administrator for the OS dongle. Multiple users can use the OS dongle, however, the owner of the OS dongle (the cloud administrator for the OS dongle) can determine the allowed usage of the OS dongle by each individual user.

As an example, the owner of the dongle may be traveling with coworkers to a conference, and the OS dongle owner can be preparing a presentation for the conference. The scenario illustrated in FIG. 3 may depict an office, home, or hotel room setup for the OS dongle owner who can plug in/interface the OS dongle to the display monitor 320, and use applications and files resident in the cloud to work on their presentation. In some cases, the OS dongle owner may store a copy of the presentation locally in the memory included on the OS dongle. The OS dongle owner may then share the OS dongle with a coworker who is also presenting at the conference. The scenario illustrated in FIG. 4 may depict an office, home, or hotel room setup for the coworker who can plug in/interface the OS dongle to the display monitor 420, and use applications and files resident in the cloud to work on their presentation. In some cases, the OS dongle owner may setup the OS dongle to restrict the applications and files accessible to the coworker when they use the OS dongle. In a similar manner, the coworker can store a copy of their presentation locally in the memory included on the OS dongle. The stored files of the coworker and the OS dongle owner can be partitioned into different file spaces that can be accessed only by the owner of the files.

The OS dongle owner and their coworker can bring the OS dongle to a conference room where they will each present their presentations. Referring to the scenario illustrated in FIG. 5A, for example, the OS dongle can be plugged into/interfaced with the display monitor 520, which can be the display that is being used for the presentations. Each user of the OS dongle (the owner and the coworker) can individually authenticate themselves for use of the OS dongle. In some cases, if the presentation was stored locally on the OS dongle, the OS dongle may operate offline (not connected to a network). For example, the mobile device 544 can be used to authenticate the user to the OS dongle as well as a type of remote control for controlling the presentation on the display monitor 520.

For example, the owner of an OS dongle may authorize another user of the OS dongle for a more limited use of operation. The owner of the OS dongle may have unlimited use of cloud applications, content, and files. An authorized user of the OS dongle may have limited use of the OS dongle to a subset of applications, content, and files determined by the owner of the OS dongle (e.g., a type of parental control). For example, the owner of the OS dongle may have unlimited use of cloud applications, content, and files. An authorized user of the OS dongle may be limited to the use of the OS dongle in a kiosk mode of operation. For example, the owner may lend the OS dongle to a coworker who may plug the OS dongle into a display monitor that can display updated weather conditions.

In some implementations, an OS dongle (e.g., the OS dongles 100, 200, 300, 400, 500, and 600) can run applications for an operating system that is different than the operating system included in the OS dongle. In some cases, the OS dongle can run a virtual operating system in the cloud that can then execute the applications. In other cases, the applications operating in the different operating system may be implemented to also execute on the operating system included in the OS dongle.

The OS dongles described herein can be self-configuring. Referring to FIG. 3, for example, when the OS dongle 300 boots up it can discover and connect to the keyboard 340 and the mouse 342. Based on making these connections, the OS dongle 300 can be configured to run the operating system in a full computer mode. For example, in this mode of operation the user of the OS dongle 300 can access files, applications, and content on the cloud. In addition, the user can access data stored internal to the OS dongle 300 in memory 212. The data can be stored in a secure manner and may only be accessible by the user who created the data.

Referring to FIG. 4, for example, the OS dongle 400 can discover and connect to the keyboard 440 and the mobile device 444. Based on making these connections, the OS dongle 400 can be configured to run the operating system in a full computer mode, using the mobile device 444 as a type of mouse input device (e.g., a pointing device). Referring to FIG. 5A, for example, the OS dongle 500 may discover and connect to the mobile device 544, receive an authentication code and then the OS dongle 500 can boot into a kiosk mode of operation. Referring to FIG. 6A, for example, the OS dongle 600 may discover and connect to the casting terminal 650, and receive an indication of a web browser application and/or content in the cloud for use by the OS dongle 600. The OS dongle 600 can run the web browser application in the cloud and provide or "cast" a tab or page of the web browser application to the cast terminal 650.

In some implementations, a user of an OS dongle can alternate between modes of operation by changing/swapping in and out the peripherals that are connected to the OS dongle.

Figure 7:
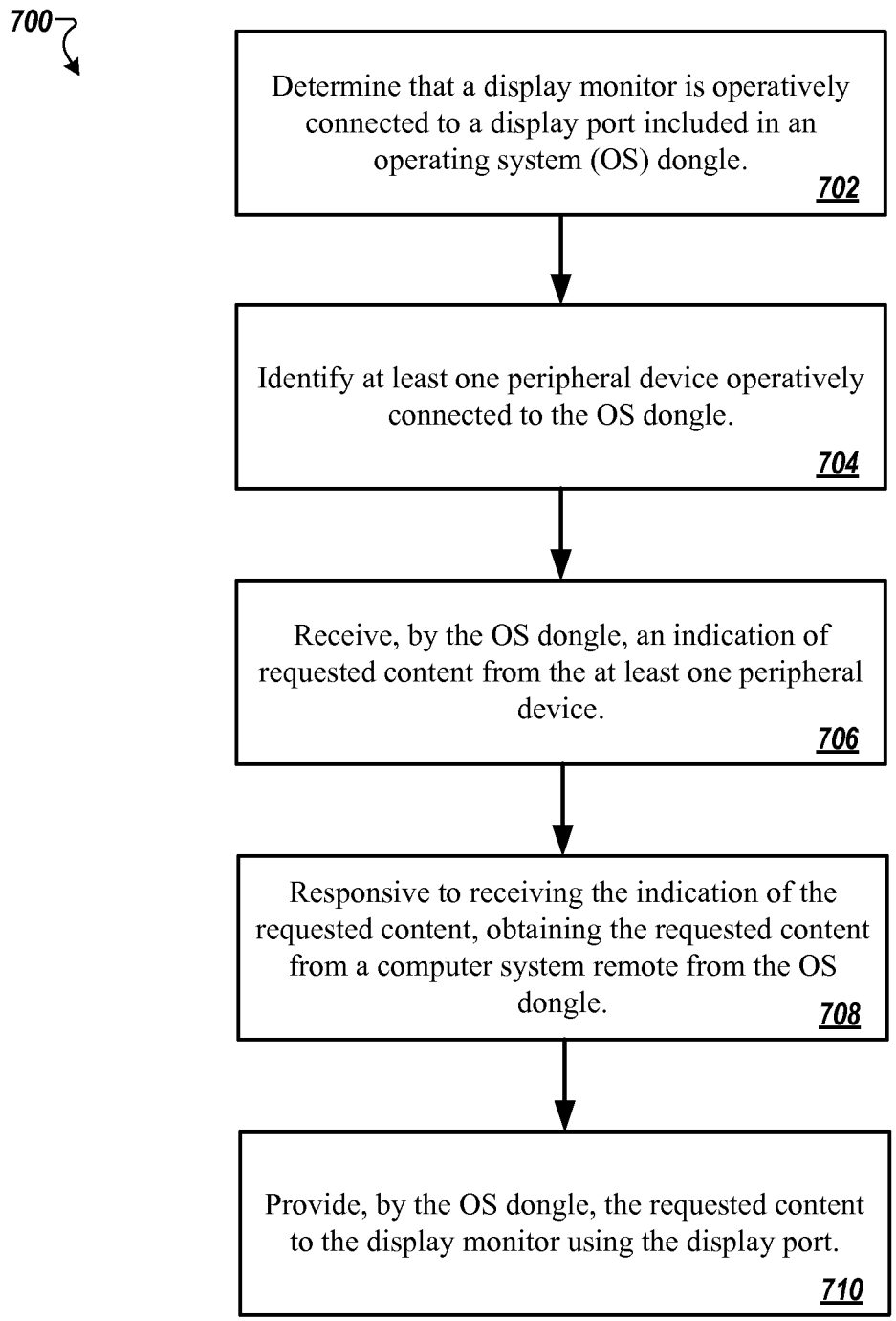
FIG. 7 is a flowchart that illustrates a method for using an operating system dongle.

FIG. 7 is a flowchart that illustrates a method 700 for using an operating system dongle. In some implementations, the systems described herein can implement the method 700. For example, the method 700 can be implemented by the apparatus and systems included in FIGS. 1A-D, 2, 3, 4, 5A-B, and 6A-B.

A display monitor is determined to be operatively connected to a display port included in an operating system (OS) dongle (block 702). At least one peripheral device operatively connected to the OS dongle is identified (block 704). The OS dongle receives an indication of requested content from the at least one peripheral device (block 706). Responsive to receiving the indication of the requested content, the requested content is obtained from a computer system remote from the OS dongle (block 708). The obtaining can include operatively connecting the OS dongle to a network. The network can be operatively interfaced to the computer system that includes the requested remote content. The OS dongle provides the requested content to the display monitor using the display port (block 710).

Figure 8:
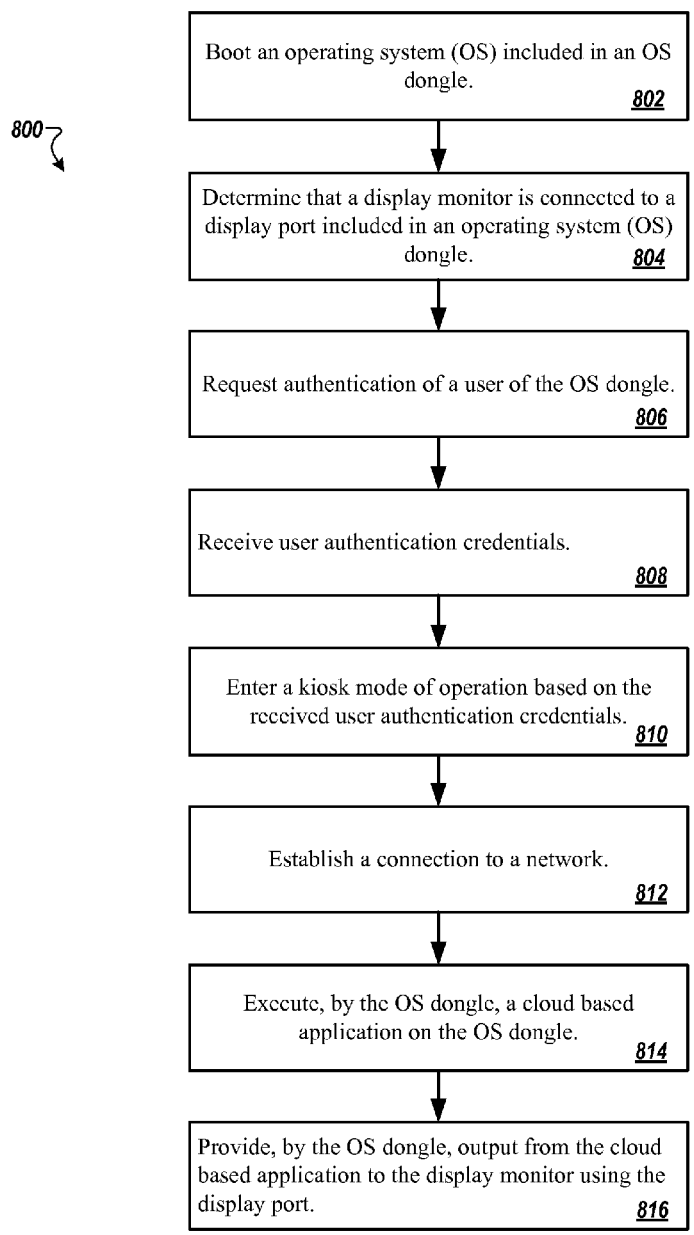
FIG. 8 is a flowchart that illustrates an alternate method for using an operating system dongle.

FIG. 8 is a flowchart that illustrates an alternate method 800 for using an operating system dongle. In some implementations, the systems described herein can implement the method 800. For example, the method 700 can be implemented by the apparatus and systems included in FIGS. 1A-D, 2, 3, 4, 5A-B, and 6A-B.

An operating system included in an OS dongle is booted (block 802). A display monitor is determined to be connected to a display port included in an operating system (OS) dongle (block 804). Authentication of a user of the OS dongle is requested (block 806). User authentication credentials are received (block 808). The OS dongle enters a kiosk mode of operation based on the received user authentication credentials (block 810). A connection to a network is established (block 812). The network can include a connection to at least one computer system. The OS dongle executes a cloud based application on the OS dongle (block 814). The cloud based application can be included in the at least one computer system. The OS dongle provides output from the cloud based application to the display monitor using the display port (block 816).

The logic flow depicted in FIG. 8 (order of the steps included in the method 800) does not require the particular order shown, or necessarily the following of a sequential order, to achieve desirable results. In addition, other steps may be provided, or steps may be eliminated, from the described flow of the method 800.

Figure 9:
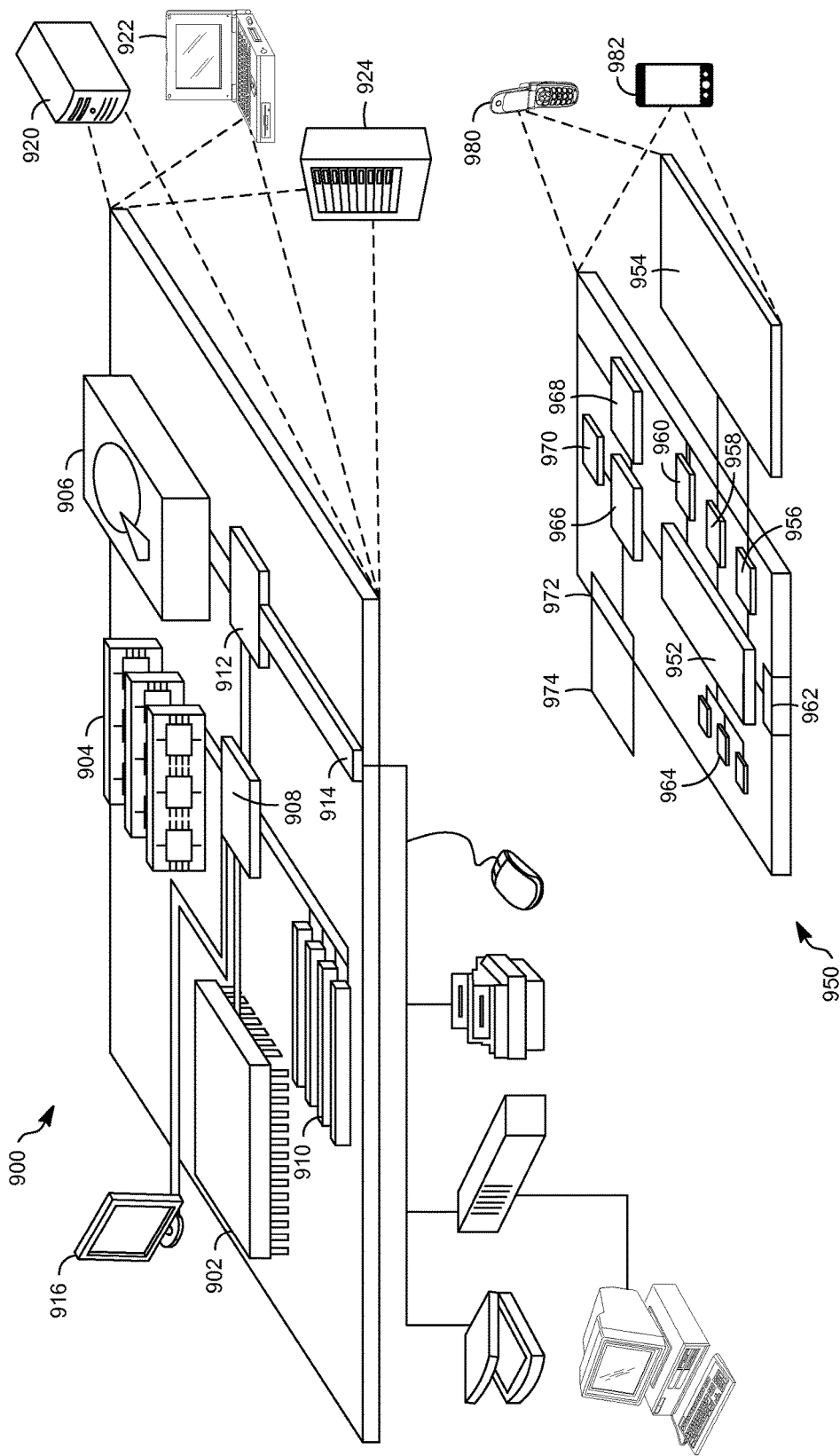
FIG. 9 shows an example of a computer device and a mobile computer device that can be used to implement the techniques described herein.

FIG. 9 shows an example of a generic computer device 900 and a generic mobile computer device 950, which may be used with the techniques described herein. For example, the OS dongles described herein may connect to or interface with the generic computer device 900 and the generic mobile computer device 950.

Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, which may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
    determining that a display monitor is operatively connected to a high-definition multimedia interface (HDMI) display port included in an operating system (OS) dongle, the OS dongle being self-contained and using a virtual OS provided from a cloud, the OS dongle storing an OS in a memory not including a desktop user interface, wherein running the virtual OS provides the desktop user interface;
    identifying at least one peripheral device operatively connected to the OS dongle;
    receiving, by the OS dongle, an indication of requested content from the at least one peripheral device;
    responsive to receiving the indication of the requested content, obtaining the requested content from a computer system remote from the OS dongle, the obtaining comprising operatively connecting the OS dongle to a network, the network being operatively interfaced to the computer system that includes the requested remote content; and
    providing, by the OS dongle and using the virtual OS, the requested content to the display monitor using the HDMI display port;
    wherein the memory is configured to operatively support the virtual OS while allowing a user to locally buffer content and data securely.

2. The method of claim 1, further comprising:
    receiving, by the OS dongle, user authentication credentials; and
    based on verifying the user authentication credentials, enabling the OS dongle to receive input from the at least one peripheral device.

3. The method of claim 2, wherein the user authentication credentials are associated with an owner of the OS dongle.

4. The method of claim 2, wherein the user authentication credentials are associated with a user of the OS dongle authorized by a cloud administrator of the OS dongle.

5. The method of claim 1, wherein the at least one peripheral device is one of a keyboard, trackpad, touchpad, or mouse.

6. A method comprising:
    booting, in an operating system (OS) dongle, a virtual OS provided from a cloud, a memory of the OS dongle having stored therein an OS not including a desktop user interface, wherein running the virtual OS provides the desktop user interface, and wherein the memory is configured to operatively support the virtual OS while allowing a user to locally buffer content and data securely;
    determining that a display monitor is connected to a high-definition multimedia interface (HDMI) display port included in the OS dongle;
    requesting authentication of a user of the OS dongle;
    receiving user authentication credentials;
    entering the OS dongle into a kiosk mode of operation based on the received user authentication credentials;
    establishing a connection to a network, the network including a connection to at least one computer system;
    executing, by the OS dongle, a cloud based application on the OS dongle, the cloud based application included in the at least one computer system; and
    providing, by the OS dongle and using the virtual OS, output from the cloud based application to the display monitor using the HDMI display port.

7. The method of claim 6, wherein the user authentication credentials are for an owner of the OS dongle.

8. The method of claim 7, further comprising:
    accessing at least one setting for the owner of the OS dongle based on the received user authentication credentials, the at least one setting being a list of users authorized to use the OS dongle; and
    updating the list of authorized users.

9. The method of claim 8, further comprising:
updating, for at least one authorized user included in the updated list of authorized users, an indication of what the at least one authorized user is authorized to do with the OS dongle.

10. The method of claim 6, wherein the user authentication credentials are for a user authorized as a user of the OS dongle by an owner of the OS dongle.

11. The method of claim 6, further comprising:
accessing at least one setting for a user of the OS dongle based on the received user authentication credentials; and
changing, by the user, the accessed at least one setting.

12. The method of claim 6, wherein receiving the user authentication credentials includes receiving a near field communication (NFC) enabled one time password (OTC) token.

13. An apparatus comprising:
a high-definition multimedia interface (HDMI) display port configured to interface to a display connector included on a display monitor;
a WiFi communication module;
a central processing unit (CPU);
a graphics processing unit (GPU);
a video processing unit (VPU); and
a WiFi antenna configured to operatively interface with the WiFi communication module and a WiFi network external to the apparatus, the CPU, the GPU, and the VPU operatively configured to execute a virtual operating system (OS) provided from a cloud, the apparatus being self-contained and storing an OS in a memory, the OS not including a desktop user interface, wherein running the virtual OS provides the desktop user interface, and to execute at least one application stored remote from the apparatus, wherein the memory is configured to operatively support the virtual OS while allowing a user to locally buffer content and data securely, and wherein the apparatus is configured to provide, using the virtual OS, requested content to a display monitor using the HDMI display port.

14. The apparatus of claim 13, wherein the application is stored on the cloud.

15. The apparatus of claim 13, further comprising:
a Bluetooth communication module configured to operatively couple at least one peripheral device to the apparatus.

16. The apparatus of claim 15, wherein the at least one peripheral device is one of a keyboard, trackpad, touchpad, or mouse.

17. The apparatus of claim 13, further comprising:
at least one communications connector; and
a Universal Serial Bus (USB) communication module configured to operatively couple at least one peripheral device interfaced to the at least one communications connector to the apparatus.

18. The apparatus of claim 13, further comprising:
a memory interface configured to provide an interface between the memory and the CPU, the GPU, and the VPU.

19. The apparatus of claim 13, wherein a height of the apparatus is approximately 0.5 inches, a length of the apparatus is approximately 3.2 inches, and a width of the apparatus is approximately 2.2 inches.

20. The apparatus of claim 13, further comprising a communications module configured to receive user authentication credentials, wherein the CPU, the GPU, and the VPU are operatively configured to execute the virtual OS on the apparatus and to execute the at least one application stored remote from the apparatus based on the received user authentication credentials.

* * * * *

UNITED STATES PATENT AND TRADEMARK OFFICE
CERTIFICATE OF CORRECTION

PATENT NO. : 10,275,370 B2
APPLICATION NO. : 14/949149
DATED : April 30, 2019
INVENTOR(S) : Perez et al.

Page 1 of 1

It is certified that error appears in the above-identified patent and that said Letters Patent is hereby corrected as shown below:

On the Title Page

On Page 2, Column 2, in item (56), under "OTHER PUBLICATIONS", Line 31, delete "Dangle" and insert -- Dongle --, therefor.

Signed and Sealed this
Ninth Day of July, 2019

Andrei Iancu
*Director of the United States Patent and Trademark Office*